(12) United States Patent
Ishizuka

(10) Patent No.: US 7,773,871 B2
(45) Date of Patent: Aug. 10, 2010

(54) RETRACTABLE PHOTOGRAPHIC LENS

(75) Inventor: Kazunori Ishizuka, Kanagawa (JP)

(73) Assignee: Hoya Corporation, Tokyo (JP)

( * ) Notice: Subject to any disclaimer, the term of this patent is extended or adjusted under 35 U.S.C. 154(b) by 797 days.

(21) Appl. No.: 11/671,638

(22) Filed: Feb. 6, 2007

(65) Prior Publication Data

US 2007/0183769 A1 Aug. 9, 2007

(30) Foreign Application Priority Data

Feb. 8, 2006 (JP) ............................. 2006-031675

(51) Int. Cl.
*G03B 17/00* (2006.01)
*G03B 5/02* (2006.01)
*G02B 7/02* (2006.01)

(52) U.S. Cl. ..................... 396/73; 396/349; 359/817

(58) Field of Classification Search ................ 396/349
See application file for complete search history.

(56) References Cited

U.S. PATENT DOCUMENTS

| 6,978,089 | B2 | 12/2005 | Nomura et al. | 396/75 |
| 7,546,029 | B2 * | 6/2009 | Ishizuka et al. | 396/73 |
| 2003/0156832 | A1 | 8/2003 | Nomura et al. | 396/72 |
| 2005/0207748 | A1 | 9/2005 | Ishizuka et al. | 396/349 |
| 2006/0034604 | A1 | 2/2006 | Nomura et al. | 396/349 |
| 2006/0045516 | A1 | 3/2006 | Ishizuka et al. | 396/349 |
| 2007/0047937 | A1 * | 3/2007 | Huang | 396/73 |
| 2008/0310035 | A1 * | 12/2008 | Kato | 359/817 |
| 2009/0231731 | A1 * | 9/2009 | Sasaki | 359/700 |

FOREIGN PATENT DOCUMENTS

| EP | 1632800 | 3/2006 |
| GB | 2412182 | 9/2005 |
| JP | 2003-315861 | 11/2003 |

OTHER PUBLICATIONS

English Language Abstract of JP 2003-315861, Nov. 6, 2003.

* cited by examiner

*Primary Examiner*—Melissa J Koval
(74) *Attorney, Agent, or Firm*—Greenblum & Bernstein, P.L.C.

(57) ABSTRACT

A retractable photographic lens including a photographing optical system includes a plurality of optical elements including at least two radially-retractable optical elements; wherein the plurality of optical elements are aligned with an optical axis in an operating state of the retractable photographic lens. When the retractable photographic lens moves from the operating state to a fully retracted state, the two radially-retractable optical elements of the plurality of optical elements are radially retracted to respective radially retracted positions thereof away from the optical axis in different radial directions and moved rearward in the optical axis direction to be positioned adjacent to each other in a plane orthogonal to the optical axis.

16 Claims, 16 Drawing Sheets

Fig.15
Fig.16
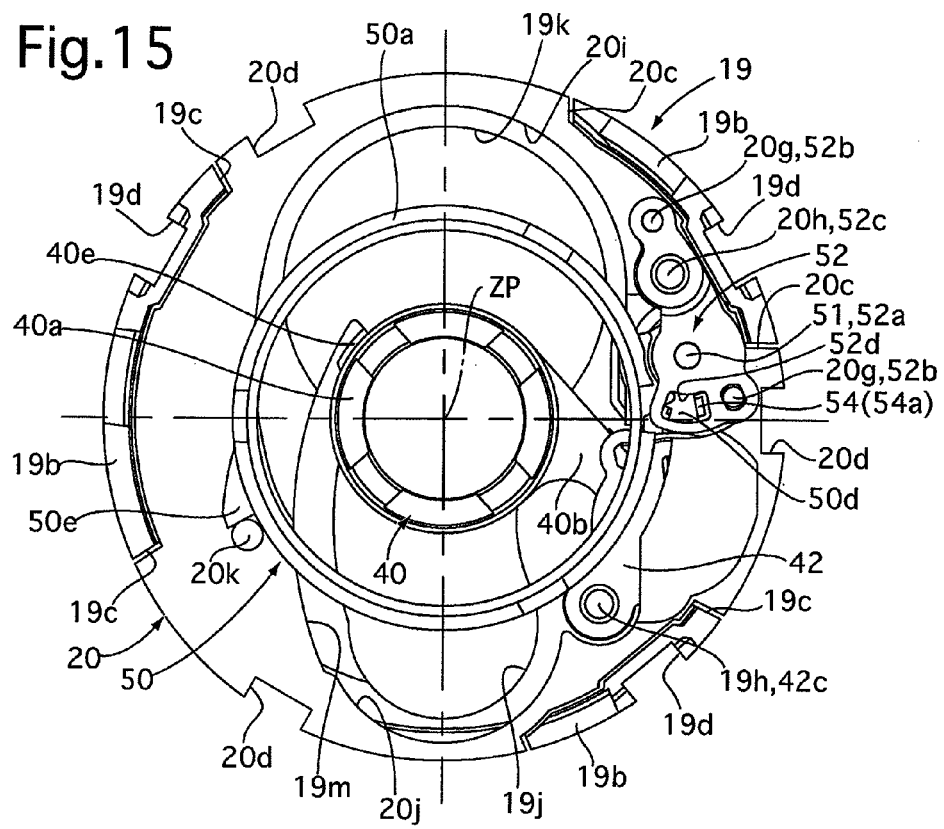
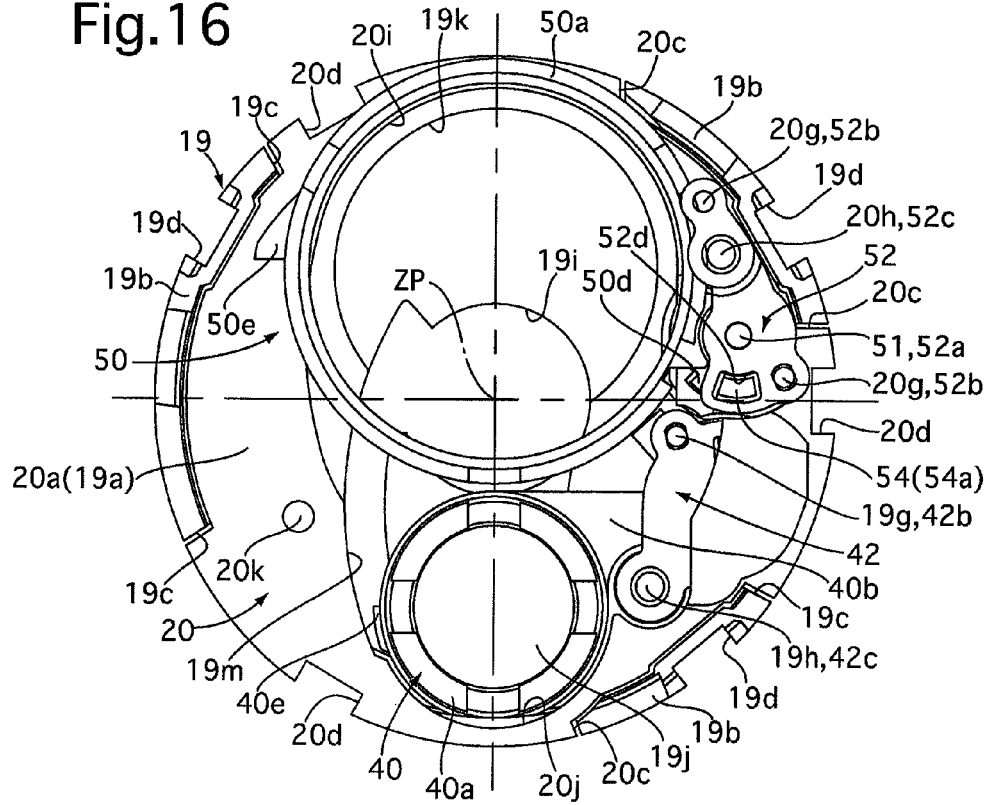

RETRACTABLE PHOTOGRAPHIC LENS

BACKGROUND OF THE INVENTION

1. Field of the Invention

The present invention relates a retractable photographic lens which can retract to make the length thereof shorter than that in a ready-to-photograph state when no picture taking is carried out.

2. Description of the Related Art

Miniaturization of cameras is ever continuous, and therefore, miniaturization of retractable photographic lenses for cameras, which retract to reduce the length thereof in a non-operating state, has been in increasing demand. As a solution to meet this demand, the assignee of the present invention has proposed a retractable lens which is disclosed in U.S. Pat. No. 6,978,089 (U.S. patent application Ser. No. 10/368,342). This retractable lens is characterized in that a plurality of optical elements of a photographing optical system are aligned with an optical axis in a ready-to-photograph state, and that a part of the plurality of optical elements is radially-retracted to a position (radially-retracted position) deviating from the optical axis of the remaining optical elements while being retracted, together with remaining optical elements on the optical axis thereof, in the direction of the optical axis of the photographing optical system when the photographic lens is fully retracted.

SUMMARY OF THE INVENTION

Although the length of the photographic lens in the fully retracted state thereof can be reduced by a large amount in the photographic lens disclosed in U.S. Pat. No. 6,978,089, the present invention provides a compact retractable photographic lens which consumes less space in the fully retracted state thereof to further miniaturize the retractable photographic lens.

According to an aspect of the present invention, a retractable photographic lens including a photographing optical system is provided, including a plurality of optical elements including at least two radially-retractable optical elements; wherein the plurality of optical elements are aligned with an optical axis in an operating state of the retractable photographic lens. When the retractable photographic lens moves from the operating state to a fully retracted state, the two radially-retractable optical elements of the plurality of optical elements are radially retracted to respective radially retracted positions thereof away from the optical axis in different radial directions and moved rearward in the optical axis direction to be positioned adjacent to each other in a plane orthogonal to the optical axis.

It is desirable for the retractable photographic lens to include a first optical-axis-direction moving ring and a second optical-axis-direction moving ring which move rearward in the optical axis direction at least when the retractable photographic lens moves from the operating state to the fully retracted state; a first radially-retractable-optical-element holding member which is supported by the first optical-axis-direction moving ring to be movable along a plane orthogonal to the optical axis and holds one of the two radially-retractable optical elements; a second radially-retractable-optical-element holding member which is supported by the second optical-axis-direction moving ring to be movable along a plane orthogonal to the optical axis and holds the other of the two radially-retractable optical elements; a photographing position holding device which holds the first radially-retractable-optical-element holding member and the second radially-retractable-optical-element holding member so that the two radially-retractable optical elements are aligned with the optical axis in the operating state of the retractable photographic lens; and a retracting device which moves the two radially-retractable optical elements toward the radially retracted positions thereof in accordance with movements of the first optical-axis-direction moving ring and the second optical-axis-direction moving ring when the retractable photographic lens moves from the operating state to the fully retracted state.

It is desirable for the first optical-axis-direction moving ring and the second optical-axis-direction moving ring to approach each other so as to reduce a distance therebetween in the optical axis direction when the retractable photographic lens moves from the operating state to the fully retracted state, wherein the retracting device includes a first cam mechanism which includes first two contacting portions formed on the second optical-axis-direction moving ring and the first radially-retractable-optical-element holding member, respectively, and gives the second optical-axis-direction moving ring a component force in a direction to move the one of the two radially-retractable optical elements toward associated one of the radially retracted positions upon the first two contacting portions coming in contact with each other when the first optical-axis-direction moving ring and the second optical-axis-direction moving ring approach each other; and a second cam mechanism which includes second two contacting portions formed on the first optical-axis-direction moving ring and the second radially-retractable-optical-element holding member, respectively, and gives the first optical-axis-direction moving ring a component force in a direction to move the other of the two radially-retractable optical elements toward associated the other of the radially retracted positions upon the second two contacting portions coming in contact with each other when the first optical-axis-direction moving ring and the second optical-axis-direction moving ring approach each other.

It is desirable for the first optical-axis-direction moving ring and the second optical-axis-direction moving ring to approach each other so as to reduce a distance therebetween in the optical axis direction when the retractable photographic lens moves from the operating state to the fully retracted state, wherein the retracting device includes a cam mechanism which includes two contacting portions formed on the first radially-retractable-optical-element holding member and the second radially-retractable-optical-element holding member, respectively, and gives each of the first optical-axis-direction moving ring and the second optical-axis-direction moving ring a component force in a direction to move the two radially-retractable optical elements toward the respective radially retracted positions thereof upon the two contacting portions coming in contact with each other when the first optical-axis-direction moving ring and the second optical-axis-direction moving ring approach each other.

It is desirable for the two radially-retractable optical elements to have substantially in the same thickness in the optical axis direction, and, in the fully retracted state of the retractable photographic lens, for positions of front ends of the two radially-retractable optical elements in the optical axis direction to be substantially coincident with each other and positions of rear ends of the two of the plurality of optical elements in the optical axis direction to be substantially coincident with each other.

It is desirable for each of the two radially-retractable optical elements to include a radially-retractable lens group. The plurality of optical elements further includes a large-diameter lens group which remains aligned with the optical axis even in the fully retracted state of the retractable photographic lens, an outer diameter of the large-diameter lens group being substantially identical to the sum of outer diameters of the two radially-retractable lens groups.

It is desirable for the two radially-retractable optical elements to be provided adjacent to each other and are positioned between a frontmost lens group and a rearmost lens group of the plurality of optical elements.

It is desirable for the two radially-retractable optical elements to be rotated in opposite rotation directions about two pivots, respectively, which extend substantially parallel to the optical axis, when the retractable photographic lens moves from the operating state to the fully retracted state.

It is desirable for the two radially-retractable optical elements to be positioned on radially opposite sides with respect to the optical axis, when the retractable photographic lens is in the fully retracted state.

It is desirable for the photographing position holding device to include a first photographing position holding device including a first stop projection formed on the first radially-retractable-optical-element holding member and a first spring which continuously biases the first radially-retractable-optical-element holding member in a direction to make the first stop projection contact with a portion of the first optical-axis-direction moving ring; and a second photographing position holding device including a second stop projection formed on the second radially-retractable-optical-element holding member and a second spring which continuously biases the second radially-retractable-optical-element holding member in a direction to make the second stop projection contact with a portion of the second optical-axis-direction moving ring.

It is desirable for the large-diameter lens group to include a frontmost lens group.

It is desirable for the retractable photographic lens to include a shutter unit including an adjustable diaphragm, wherein the two radially-retractable optical elements are positioned immediately in front of the adjustable diaphragm in the fully retracted state of the retractable photographic lens.

It is desirable for each of the first optical-axis-direction moving ring and the second optical-axis-direction moving ring to be guided linearly along the optical axis without rotating.

It is desirable for the retractable photographic lens to be a zoom lens, the two radially-retractable optical elements being moved in the optical axis direction when a zooming operation is carried out.

In an embodiment, a retractable photographic lens is provided, including a photographing optical system including a plurality of optical elements aligned with an optical axis in an operating state of the retractable photographic lens. When the retractable photographic lens moves from the operating state to a fully retracted state, at least two radially-retractable optical elements of the plurality of optical elements are moved away from each other in directions orthogonal to the optical axis so that one of the two radially-retractable optical elements occupies a part of an area which is occupied by the other of the two radially-retractable optical elements if the other of the two radially-retractable optical elements were to be in the operating state of the retractable photographic lens as viewed from front of the retractable photographic lens, and moved rearward in the optical axis direction to be positioned adjacent to each other in a plane orthogonal to the optical axis.

According to the present invention, a compact retractable photographic lens which consumes less space in the fully retracted state thereof to further miniaturize the retractable photographic lens is achieved.

The present disclosure relates to subject matter contained in Japanese Patent Application No. 2006-31675 (filed on Feb. 8, 2006), which is expressly incorporated herein by reference in its entirety.

BRIEF DESCRIPTION OF THE DRAWINGS

The present invention will be described below in detail with reference to the accompanying drawings in which:

FIG. 15 is a front elevational view of the second lens group frame, the third lens group frame and other elements, showing the relative positions of the second lens group frame and the third lens group frame in a ready-to-photograph state of the zoom lens;

FIG. 16 is a view similar to that of FIG. 15, showing the relative positions of the second lens group frame and the third lens group frame in the fully retracted state of the zoom lens;

DESCRIPTION OF THE PREFERRED EMBODIMENTS

Figure 1:
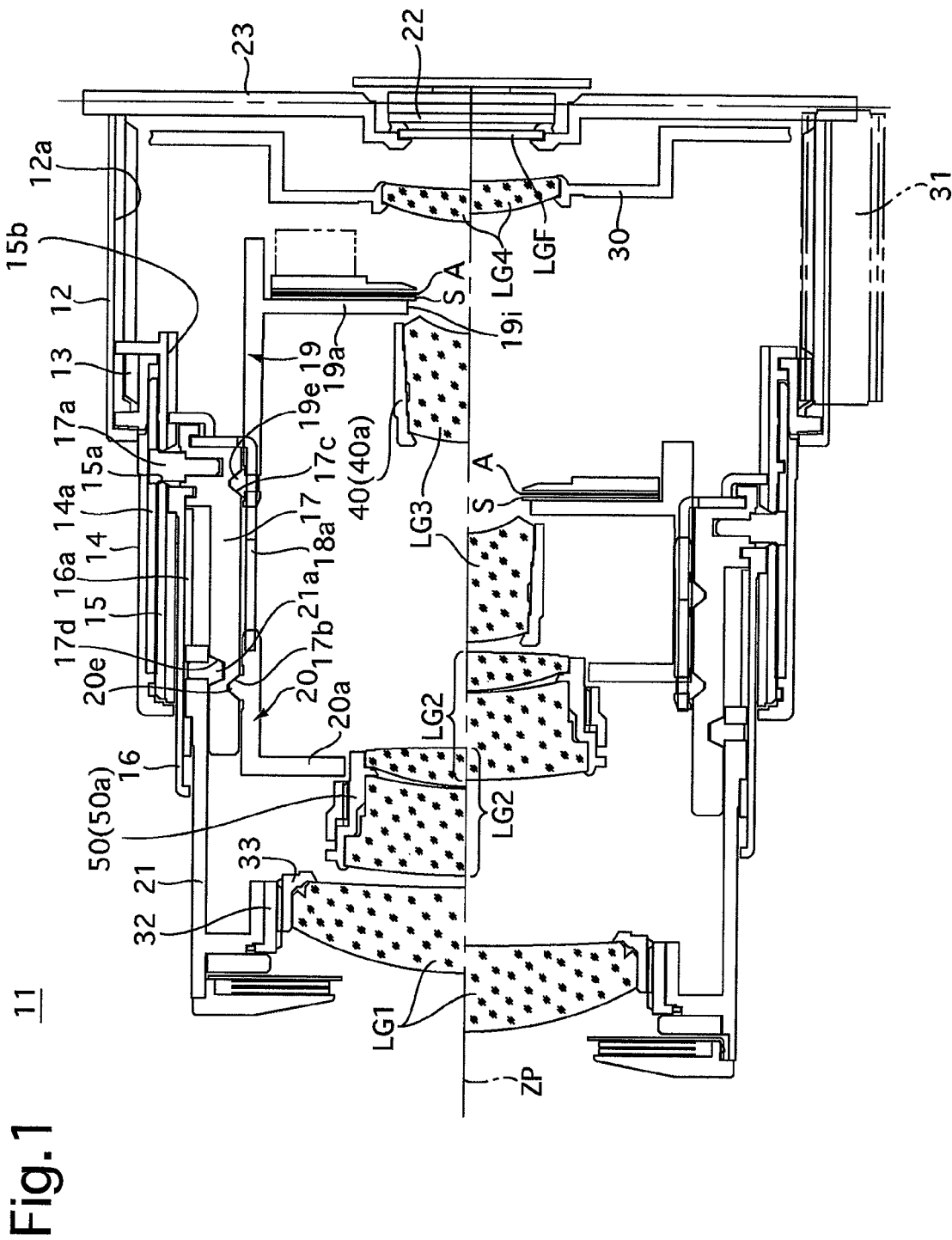
FIG. 1 is a longitudinal sectional view of a retractable zoom lens of a digital camera according to the present invention, wherein an upper half portion and a lower half portion of the zoom lens from a photographing optical axis thereof show ready-to-photograph states of the zoom lens set at the wide-angle extremity and the telephoto extremity, respectively.
Figure 2:
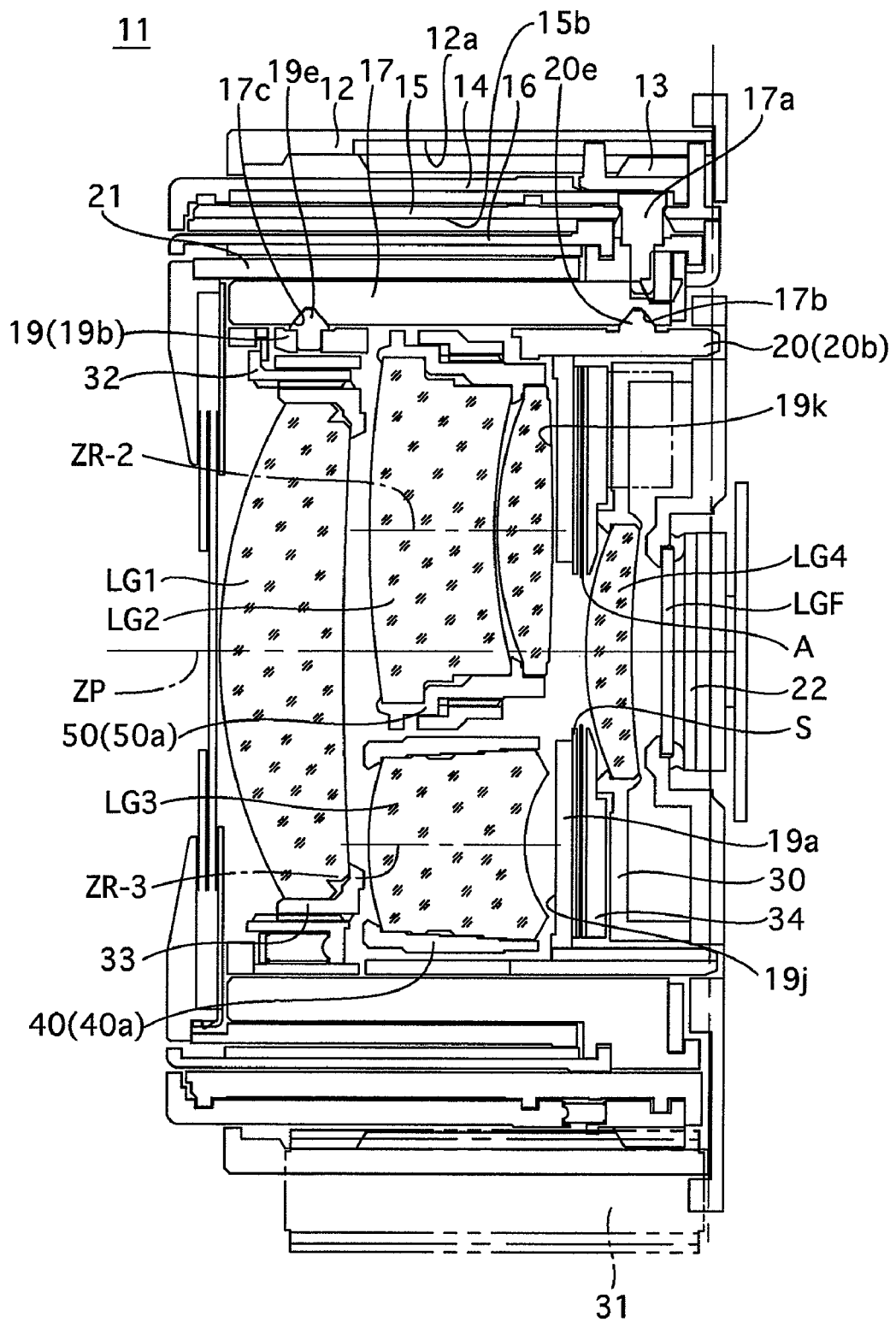
FIG. 2 is a longitudinal sectional view of the zoom lens shown in FIG. 1 in the fully retracted state thereof.

A zoom lens 11 incorporated in a digital camera, longitudinal sectional views of which are shown in FIGS. 1 and 2, is a telescopic zoom lens which extends forward toward the object side (leftward as viewed in FIG. 1) in an optical axis direction (horizontal direction as viewed in FIGS. 1 and 2) when the digital camera is used to photograph. When photography is not being carried out (e.g., upon a main switch of the digital camera being turned OFF), the zoom lens 11 is accommodated (fully retracted) as shown in FIG. 2 to thereby reduce the length of the zoom lens 11 in the optical axis direction. In FIG. 1, a cross sectional view of an upper half portion of the zoom lens 11 from a photographing optical axis ZP thereof shows a state of the zoom lens 11 set at the wide-angle extremity, while a cross sectional view of a lower half portion of the zoom lens 11 from the photographing optical axis ZP shows a state of the zoom lens 11 set at the telephoto extremity. In the fully retracted state of the zoom lens 11 shown in FIG. 2, the zoom lens 11 is fully retracted into a camera body (not shown) of the digital camera.

The zoom lens 11 is provided with a plurality of ring members (hollow-cylindrical members): a stationary barrel 12, a helicoid ring 13, a first movable barrel 14, a first linear guide ring 15, a second movable barrel 16, a cam ring 17, a second linear guide ring 18, a third lens group support ring (optical-axis-direction moving ring) 19, a second lens group support ring (optical-axis-direction moving ring) 20 and a first lens group support ring 21 which are substantially concentrically arranged.

Figure 3:
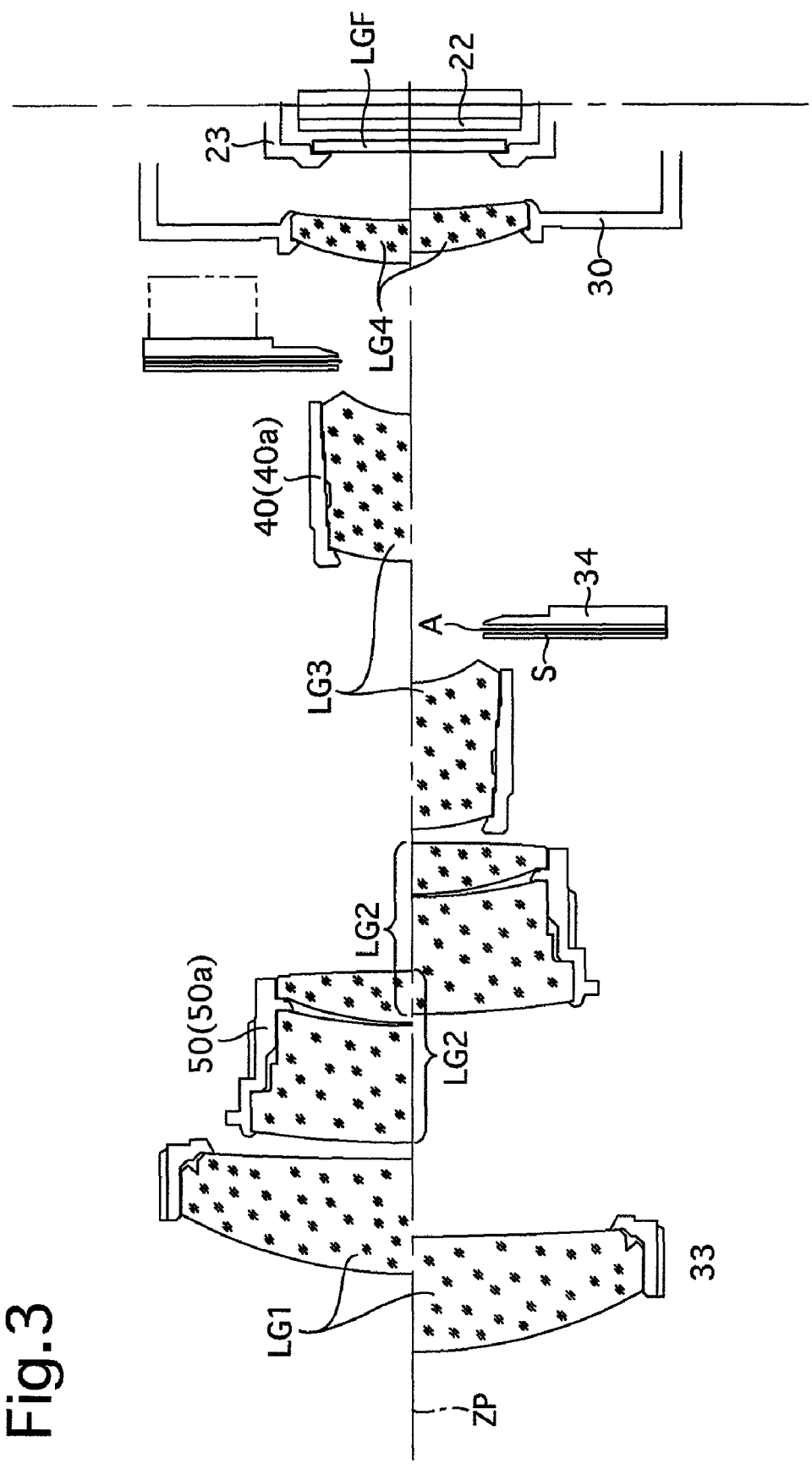
FIG. 3 is a longitudinal sectional view of the optical elements and associated elements thereof shown in FIG. 1, showing the relative positions of the optical elements in two ready-to-photograph states of the zoom lens.

The zoom lens 11 is provided with a photographing optical system including a first lens group LG1, a second lens group (radially-retractable optical element) LG2, a third lens group (radially-retractable optical element) LG3, a shutter S, an adjustable diaphragm A, a fourth lens group LG4, a low-pass filter LGF and a CCD image sensor 22, in that order from the object side. Among all the lens groups of this photographing optical system, the first lens group LG1 has the largest outer diameter and the sum of the outer diameter of the second lens group LG2 and the outer diameter of the third lens group LG3 is approximately the same as the outer diameter of the first lens group LG1. The thicknesses of the second lens group LG2 and the third lens group LG3 in the optical axis direction are substantially identical. Each optical element from the first lens group LG1 to the CCD image sensor 22 is positioned on the photographing optical axis (common optical axis) ZP when the zoom lens 11 is in a ready-to-photograph state (operating state) as shown in FIGS. 1 and 3. The photographing optical axis ZP is substantially coincident with a common axis of the aforementioned plurality of ring members (hollow-cylindrical members). The first lens group LG1, the second lens group LG2 and the third lens group LG3 are moved along the photographing optical axis ZP in a predetermined moving manner to perform a zooming operation, and the fourth lens group LG4 is moved along the photographing optical axis ZP to perform a focusing operation. In the following description, the term "optical axis direction" refers to a direction parallel to the photographing optical axis ZP and the terms "object side" and "image side" refer to forward and rearward of the zoom lens 11, respectively.

The stationary barrel 12 is positioned in the camera body and fixed thereto, while a stationary holder 23 is fixed to a rear portion of the stationary barrel 12. The CCD image sensor 22 and the low-pass filter LGF are supported by the stationary holder 23.

The zoom lens 11 is provided in the stationary barrel 12 with a fourth lens frame 30 which supports and holds the fourth lens group LG4. The fourth lens frame 30 is guided linearly in a direction parallel to the photographing optical axis ZP by guide shafts (not shown) and can be moved forward and rearward in the optical axis direction by an AF (autofocus) motor (not shown).

The zoom lens 11 is provided with a zoom motor (not shown). The driving force of this zoom motor is transferred to a zoom gear 31 via a reduction gear train (not shown). The zoom gear 31 is rotatably fitted on a zoom gear shaft (not shown) which is fixed to the stationary barrel 12 to extend parallel to the photographing optical axis ZP. The helicoid ring 13 is positioned inside the stationary barrel 12 and supported thereby. The helicoid ring 13 is rotated by rotation of the zoom gear 31. The helicoid ring 13 is moved forward and rearward in the optical axis direction while being rotated about the photographing optical axis ZP via a helicoid structure provided between the helicoid ring 13 and the stationary barrel 12. The first movable barrel 14 is coupled to the helicoid ring 13 to be rotatable together with the helicoid ring 13 about the photographing optical axis ZP and to be movable together with the helicoid ring 13 in the optical axis direction.

The first linear guide ring 15 is positioned inside the first movable barrel 14 and the helicoid ring 13 and supported thereby. The first linear guide ring 15 is guided linearly in the optical axis direction via linear guide grooves 12a (only one of which appears in FIGS. 1 and 2) formed on an inner peripheral surface of the stationary barrel 12, and is engaged with the helicoid ring 13 and the first movable barrel 14 to be both rotatable about the photographing optical axis ZP relative to the helicoid ring 13 and the first movable barrel 14 and movable with the helicoid ring 13 and the first movable barrel 14 in the optical axis direction.

The first linear guide ring 15 is provided with a plurality of through-slots 15a (only one of which appears in FIG. 1) which radially penetrate inner and outer peripheral surfaces of the first linear guide ring 15. Each through-slot 15a includes an inclined lead slot portion which is inclined to the photographing optical axis ZP. A corresponding plurality of followers 17a (only one of which appears in FIG. 1) which project radially outward from an outer peripheral surface of the cam ring 17 are engaged in the plurality of through-slots 15a, respectively. The plurality of followers 17a are further slidably engaged in a corresponding plurality of rotation transfer grooves 14a (only one of which appears in FIG. 1) which are formed on an inner peripheral surface of the first movable barrel 14 and extend parallel to the photographing optical axis ZP so that the cam ring 17 rotates with the first movable barrel 14. The cam ring 17 is moved forward and rearward in the optical axis direction while being rotated about the photographing optical axis ZP with the plurality of followers 17a of the cam ring 17 being guided by the lead slot portions of the plurality of through-slots 15a therealong, respectively.

The first linear guide ring 15 guides the second linear guide ring 18 and the second movable ring 16 linearly in the optical axis direction by a plurality of linear guide grooves 15b (only one of which appears in FIGS. 1 and 2) which are formed on an inner peripheral surface of the first linear guide ring 15 to extend parallel to the photographing optical axis ZP. The second linear guide ring 18 guides each of the third lens group support ring 19 and the second lens group support ring 20 linearly in the optical axis direction, while the second movable barrel 16 guides the first lens group support ring 21 linearly in the optical axis direction. Each of the second linear guide ring 18 and the second movable barrel 16 is supported by the cam ring 17 to be both rotatable relative to the cam ring 17 about the photographing optical axis ZP and movable with the cam ring 17 in the optical axis direction.

As shown in FIGS. 9 through 20, the third lens group support ring 19 is provided with a disk-shaped flange portion 19a which lies in a plane substantially orthogonal to the photographing optical axis ZP, and three partial-cylinder portions 19b and three cut-out portions 19c which are alternately arranged circumferentially on the outer edge of the disk-shaped flange portion 19a. The second lens group support ring 20 is provided with a disk-shaped flange portion 20a which lies in a plane substantially orthogonal to the photographing optical axis ZP, and three partial-cylinder portions 20b and three cut-out portions 20c which are alternately arranged circumferentially on the outer edge of the disk-shaped flange portion 20a. The three partial-cylinder portions 19b project forward from the outer edge of the disk-shaped flange portion 19a and the three partial-cylinder portions 20b project rearward from the outer edge of the disk-shaped flange portion 20a. The three partial-cylinder portions 19b and the three partial-cylinder portions 20b are slidably engaged in the three cut-out portions 20c and the three cut-out portions 19c, respectively, so that the third lens group support ring 19 and the second lens group support ring 20 can approach each other to respective positions thereof in the optical axis direction so that the disk-shaped flange portions 19a and 20a are positioned closely to each other (see FIG. 8). The three partial-cylinder portions 19b and the three partial-cylinder portions 20b are provided on outer peripheral surfaces thereof with three linear grooves 19d and three linear guide grooves 20d, respectively, which are elongated in a direction parallel to the photographing optical axis ZP and in which three key projections 18a (see FIG. 1) are slidably engaged, respectively. The third lens group support ring 19 and the second lens group support ring 20 are guided linearly in the optical axis direction via the engagement of the three key projections 18a with the three linear grooves 19d and the three linear guide grooves 20d.

The cam ring 17 is provided on an inner peripheral surface thereof with a plurality of first inner cam grooves 17b (only one of which appears in FIGS. 1 and 2) for moving the second lens group LG2, and the second lens group support ring 20 is provided on an outer peripheral surface thereof with a plurality of first cam followers 20e which are engaged in the plurality of first inner cam grooves 17b, respectively. The cam ring 17 is further provided on an inner peripheral surface thereof with a plurality of second inner cam grooves 17c (only one of which appears in FIGS. 1 and 2) for moving the third lens group LG3, and the third lens group support ring 19 is provided on an outer peripheral surface thereof with a plurality of first cam followers 19e which are engaged in the plurality of second inner cam grooves 17c, respectively. Since the third lens group support ring 19 and the second lens group support ring 20 are guided linearly in the optical axis direction without rotating via the second linear guide ring 18, a rotation of the cam ring 17 causes the third lens group support ring 19 to move in the optical axis direction in a predetermined moving manner in accordance with contours of the plurality of first inner cam grooves 17b, and simultaneously causes the second lens group support ring 20 to move in the optical axis direction in a predetermined moving manner in accordance with contours of the plurality of second inner cam grooves 17c.

The second movable barrel 16, which is guided linearly in the optical axis direction without rotating by the first linear guide ring 15, guides the first lens group support ring 21 linearly in the optical axis direction via a plurality of linear guide grooves 16a (only one of which appears in FIG. 1) formed on an inner peripheral surface of the second movable barrel 16. The first lens group support ring 21 is provided with a plurality of cam followers 21a (only one of which appears in FIG. 1) which project radially inwards, and the cam ring 17 is provided on an outer peripheral surface thereof with a plurality of outer cam grooves 17d (cam grooves for moving the first lens group LG1; only one of which appears in FIG. 1) in which the plurality of cam followers 21a are slidably engaged, respectively. The zoom lens 11 is provided inside the first lens group support ring 21 with a first lens group frame 33 which is supported by the first lens group support ring 21 via a first lens group adjustment ring 32. The first lens group frame 33 directly holds and supports the first lens group LG1.

The zoom lens 11 is provided between the third lens group LG3 and the fourth lens group LG4 with a shutter unit 34 including the shutter S and the adjustable diaphragm A. The shutter unit 34 is positioned inside the third lens group support ring 19 and fixed to the back of the disk-shaped flange portion 19a.

As shown in FIGS. 9 through 12, the zoom lens 11 is provided inside the third lens group support ring 19 with a third lens group frame (second radially-retractable-optical-element holding member) 40 which supports and holds the third lens group LG3. The third lens group frame 40 is supported by the third lens group support ring 19 to be rotatable (swingable) about a pivot shaft 41 extending parallel to the photographing optical axis ZP. The zoom lens 11 is provided inside the second lens group support ring 20 with a second lens group frame (first radially-retractable-optical-element holding member) 50 which supports and holds the second lens group LG2. The second lens group frame 50 is supported by the second lens group support ring 20 to be rotatable (swingable) about a pivot shaft 51 extending parallel to the photographing optical axis ZP.

The third lens group frame 40 is provided with a cylindrical lens holder portion 40a, a radial arm portion 40b and a pivoted cylindrical portion 40c. The cylindrical lens holder portion 40a directly holds and supports the third lens group LG3. The radial arm portion 40b extends radially outwards from the cylindrical lens holder portion 40a in a radial direction thereof to connect the cylindrical lens holder portion 40a to the pivoted cylindrical portion 40c. The pivoted cylindrical portion 40c is formed at the radially outer end of the radial arm portion 40b. The pivot shaft 41 is inserted into a through hole formed in the pivoted cylindrical portion 40c. The front and rear ends of the pivot shaft 41 are fitted into a bearing hole 42a formed in a holding plate 42 and a bearing hole 19f (see FIGS. 11, 12, 17 and 18) formed in the third lens group support ring 19. The holding plate 42 is provided with two positioning holes 42b and secured to the third lens group support ring 19 with the two positioning holes 42b being engaged with two positioning projections 19g, respectively, which project from the third lens group support ring 19. A set screw (not shown) is used to secure the holding plate 42 to the third lens group support ring 19. This set screw is inserted into an insertion hole 42c of the holding plate 42 to be screwed into a screw hole 19h made in the third lens group support ring 19. The third lens group frame 40 is provided in the vicinity of the pivoted cylindrical portion 40c with a cam-contacting portion (cam-bar/an element of a retracting device) 40d. The contacting portion 40d is in the shape of a projection which projects forward in the optical axis direction. A cam-bar insertion hole 42d is formed in the holding plate 42 in front of the contacting portion 40d to be aligned therewith in the optical axis direction.

Figure 19:
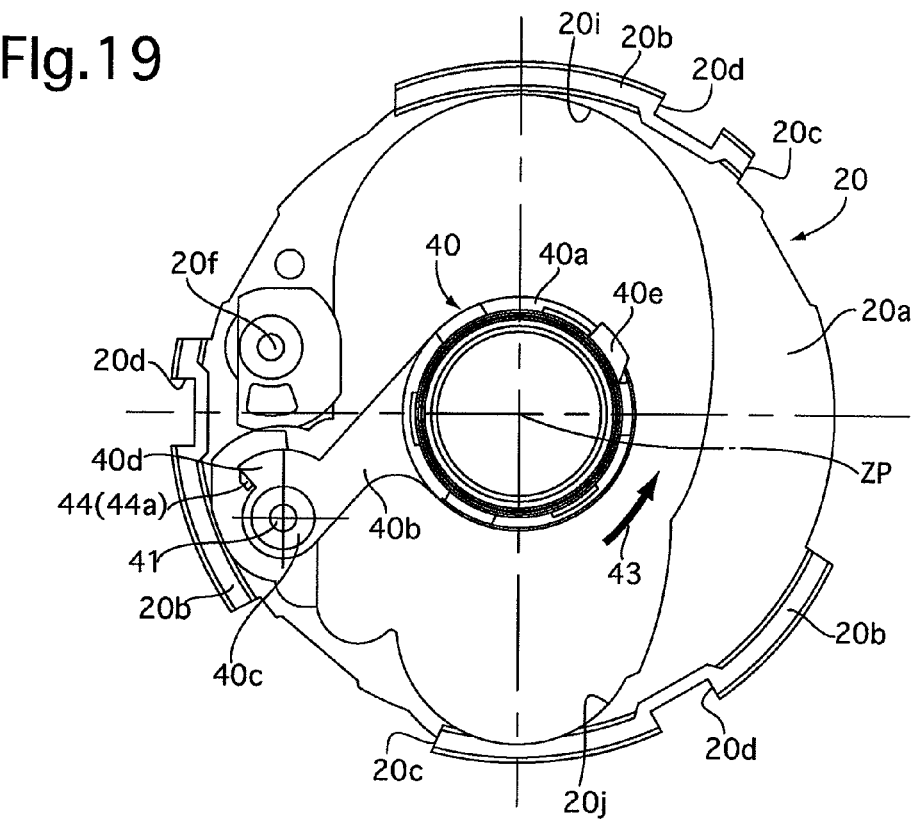
FIG. 19 is a front elevational view of the second lens group support ring and the third lens group frame in a ready-to-photograph state of the zoom lens, showing the relative positions of the second lens group support ring and the third lens group frame, viewed from the rear in the optical axis direction.
Figure 20:
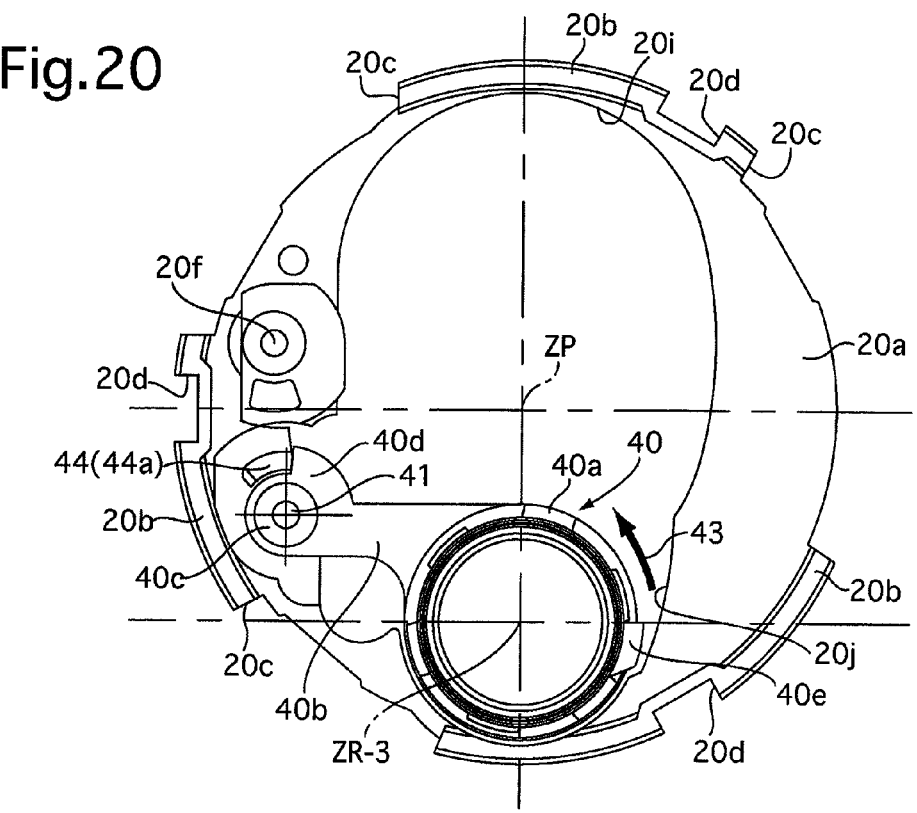
FIG. 20 is a view similar to that of FIG. 19, showing the relative positions of the second lens group support ring and the third lens group frame in the fully retracted state of the zoom lens, viewed from the rear in the optical axis direction.

The third lens group frame 40, which is pivoted on the third lens group support ring 19 via the pivot shaft 41, is rotatable (swingable) about the pivot shaft 41 between the photographing position shown in FIGS. 15 and 19 and the radially retracted position shown in FIGS. 16 and 20. The optical axis of the third lens group LG3 coincides with the photographing optical axis ZP when the third lens group frame 40 is in the photographing position. When the third lens group frame 40 moves from the photographing position to the radially retracted position, the third lens group LG3 is moved downward, away from the photographing optical axis ZP, so that the optical axis of the third lens group LG3 moves from the photographing optical axis ZP to a retracted optical axis ZR-3 positioned below the photographing optical axis ZP. The retracted optical axis ZR-3 of the third lens group LG3 in the radially retracted state of the zoom lens 11 is substantially parallel to the photographing optical axis ZP. As can be seen from FIGS. 15 and 16, the third lens group LG3 (the cylindrical lens holder portion 40a of the third lens group frame 40) is retracted to the radially retracted position thereof in such a manner as to occupy (overlap) a part of an area which would be occupied by the second lens group LG2 (a cylindrical lens holder portion 50a of the second lens group frame 50) if the second lens group LG2 was in a ready-to-photograph state of the zoom lens 11 as shown in FIG. 15, as viewed from the front of the zoom lens 11. The third lens group frame 40 is biased in a direction (counterclockwise as viewed in FIGS. 19 and 20) to rotate toward the photographing position thereof by a third lens group biasing spring (an element of a first photographing position holding device) 43 (shown conceptually by an arrow in FIGS. 19 and 20). The third lens group biasing spring 43 can be a torsion spring.

Figure 14:
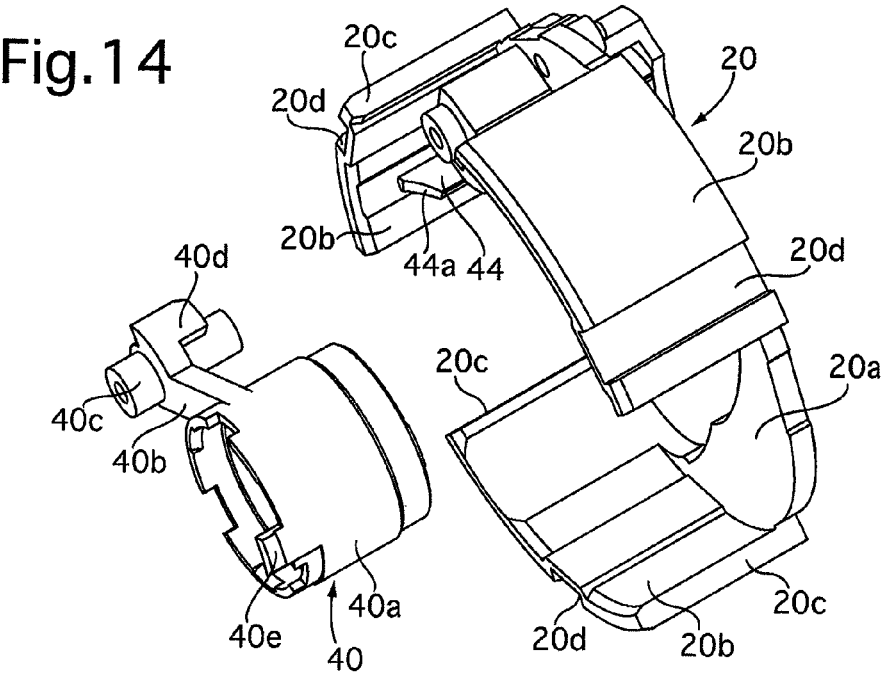
FIG. 14 is an exploded perspective view of the third lens group frame and the second lens group support ring, showing the shape of the retracting cam formed on the second lens group support ring.

As shown in FIGS. 14, 19 and 20, the second lens group support ring 20 is provided with a position-control cam projection (an element of the retracting device) 44 which projects rearward in the optical axis direction to face the contacting portion 40d. The position-control cam projection 44 is provided at a free end thereof (the rear end thereof in the optical axis direction) with a lens-retracting cam surface 44a capable of coming in contact with the contacting portion 40d. The lens-retracting cam surface 44a is shaped to give the third lens group frame 40 a component force in a direction toward the radially retracted position thereof in accordance with the relative approaching movements of the second lens group support ring 20 and the third lens group frame 40 in the optical axis direction. Accordingly, if the second lens group support ring 20 and the third lens group frame 40 are brought close to each other in the optical axis direction with the lens-retracting cam surface 44a and the contacting portion 40d being in contact with each other, the third lens group frame 40 rotates from the photographing position to the radially retracted position against the biasing force of the third lens group biasing spring 43 via the lens-retracting cam surface 44a. When the lens-retracting cam surface 44a comes into contact with the contacting portion 40d, the position-control cam projection 44 is inserted into the cam-bar insertion hole 42d of the holding plate 42.

The second lens group frame 50 is provided with a cylindrical lens holder portion 50a, a radial arm portion 50b and a pivoted cylindrical portion 50c. The cylindrical lens holder portion 50a directly holds and supports the second lens group LG2. The radial arm portion 50b extends radially outwards from the cylindrical lens holder portion 50a in a radial direction thereof to connect the cylindrical lens holder portion 50a to the pivoted cylindrical portion 50c. The pivoted cylindrical portion 50c is formed at the radially outer end of the radial arm portion 50b. The pivot shaft 51 is inserted into a through hole made in the pivoted cylindrical portion 50c. The front and rear ends of the pivot shaft 51 are fitted into a bearing hole 52a formed in a holding plate 52 and a bearing hole 20f (see FIGS. 9, 10, 19 and 20) formed in the second lens group support ring 20. The holding plate 52 is provided with two positioning holes 52b and secured to the second lens group support ring 20 with the two positioning holes 52b being engaged with two positioning projections 20g which project from the second lens group support ring 20, respectively. A set screw (not shown) is used to secure the holding plate 52 to the second lens group support ring 20. This set screw is inserted into an insertion hole 52c of the holding plate 52 to be screwed into a screw hole 20h made in the second lens group support ring 20. The second lens group frame 50 is provided in the vicinity of the pivoted cylindrical portion 50c with a cam-contacting portion (cam-bar/an element of the retracting device) 50d.

Figure 17:
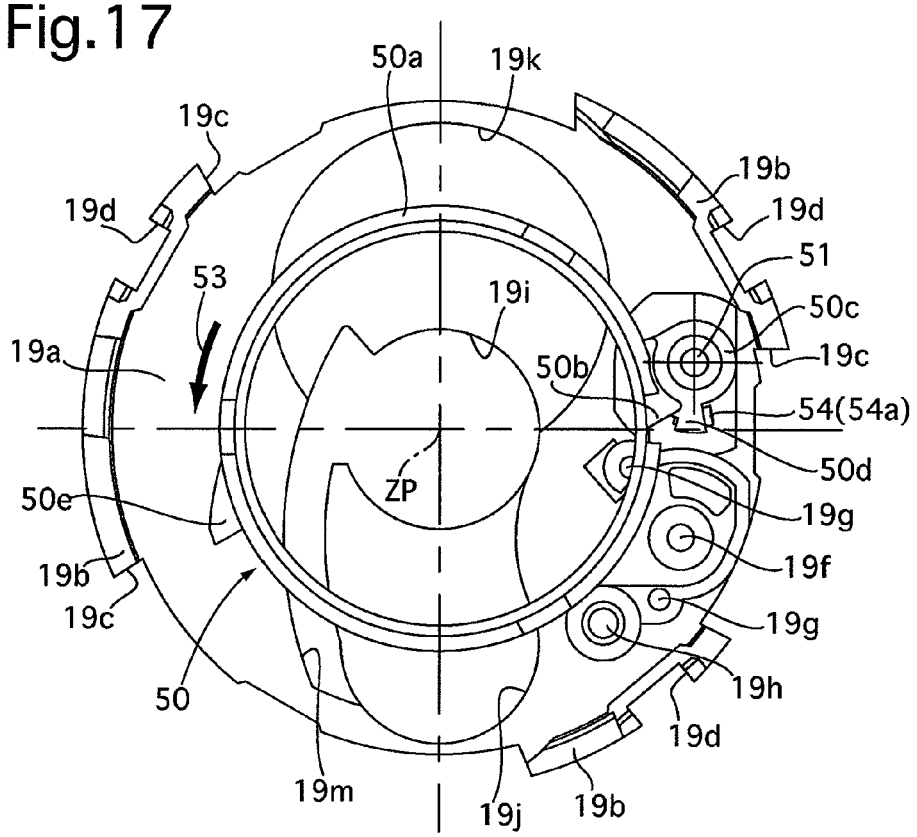
FIG. 17 is a front elevational view of the third lens group support ring and the second lens group frame, showing the relative positions thereof in a ready-to-photograph state of the zoom lens, viewed from the front in an optical axis direction.
Figure 18:
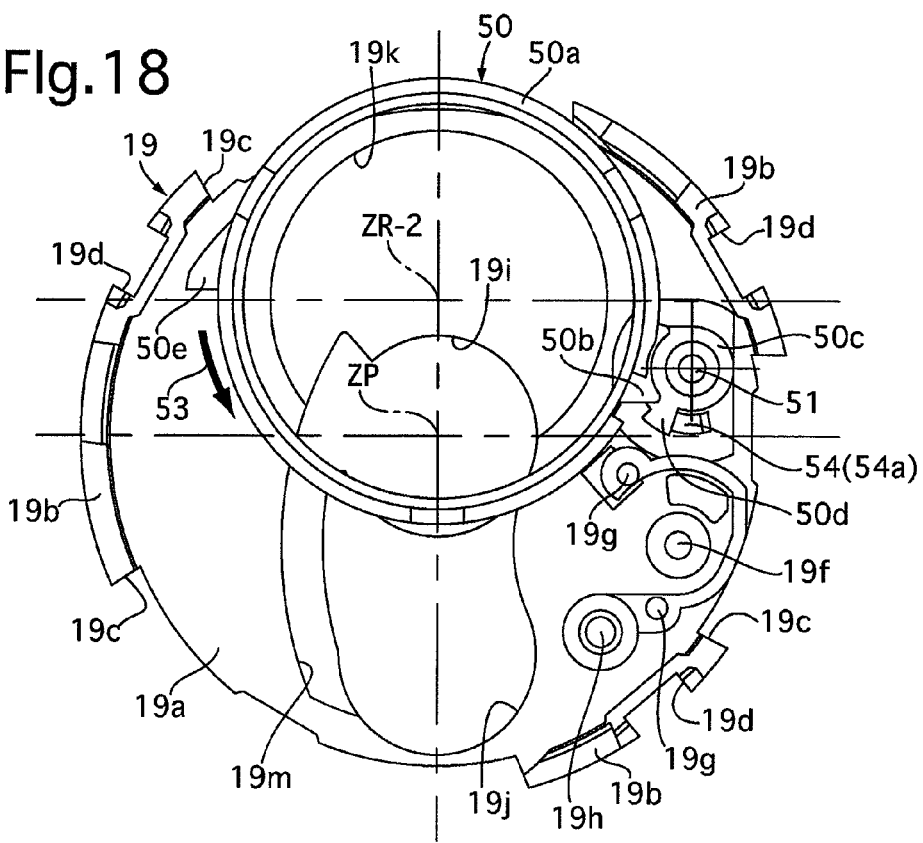
FIG. 18 is a view similar to that of FIG. 17, showing the relative positions of the third lens group support ring and the second lens group frame in the fully retracted state of the zoom lens, viewed from the front in the optical axis direction.

The second lens group frame 50, which is pivoted on the second lens group support ring 20 via the pivot shaft 51, is rotatable (swingable) about the pivot shaft 51 between the photographing position shown in FIGS. 15 and 17 and the radially retracted position shown in FIGS. 16 and 18. The optical axis of the second lens group LG2 coincides with the photographing optical axis ZP when the second lens group frame 50 is in the photographing position. When the second lens group frame 50 moves from the photographing position to the radially retracted position, the second lens group LG2 is moved upward, away from the photographing optical axis ZP, so that the optical axis of the second lens group LG2 moves from the photographing optical axis ZP to a retracted optical axis ZR-2 positioned above the photographing optical axis ZP. The retracted optical axis ZR-2 of the second lens group LG2 in the radially retracted state of the zoom lens 11 is substantially parallel to the photographing optical axis ZP. As can be seen from FIGS. 15 and 16, the second lens group LG2 (the cylindrical lens holder portion 50a of the second lens group frame 50) is retracted to the radially retracted position thereof in such a manner to occupy (overlap) a part of an area which would be occupied by the third lens group LG3 (the cylindrical lens holder portion 40a of the third lens group frame 40) if the third lens group LG3 was in a ready-to-photograph state of the zoom lens 11 as shown in FIG. 15, as viewed from the front of the zoom lens 11. The second lens group frame 50 is biased in a direction (clockwise as viewed in FIGS. 17 and 18) to rotate toward the photographing position thereof by a second lens group biasing spring (an element of a second photographing position holding device) 53 (shown conceptually by an arrow in FIGS. 17 and 18). The second lens group biasing spring 53 can be a torsion spring.

As shown in FIGS. 11 through 13, 17 and 18, the third lens group support ring 19 is provided with a position-control cam projection (an element of the retracting device) 54 which projects forward in the optical axis direction to face the cam-contacting portion 50d. The position-control cam projection 54 is provided at a front end thereof (the front end thereof in the optical axis direction) with a lens-retracting cam surface 54a capable of coming in contact with the cam-contacting portion 50d. The lens-retracting cam surface 54a is shaped to give the second lens group frame 50 a component force in a direction toward the radially retracted position thereof in accordance with the relative approaching movements of the third lens group support ring 19 and the second lens group frame 50 in the optical axis direction. Accordingly, if the third lens group support ring 19 and the second lens group frame 50 are brought close to each other in the optical axis direction with the lens-retracting cam surface 54a and the cam-contacting portion 50d being in contact with each other, the second lens group frame 50 rotates from the photographing position to the radially retracted position against the biasing force of the second lens group biasing spring 53 via the lens-retracting cam surface 54a. A cam-bar insertion hole 52d is formed in the holding plate 52 in front of the position-control cam projection 54 to be aligned therewith in the optical axis direction, and the front end of the position-control cam projection 54 is inserted into the cam-bar insertion hole 52d of the holding plate 52 when the third lens group support ring 19 and the second lens group frame 50 are at the closest possible position with respect to each other.

The third lens group support ring 19 is provided at the center of the disk-shaped flange portion 19a with a photographic aperture 19i having a substantially circular shape. The disk-shaped flange portion 19a is provided on a front surface thereof with a narrow recessed portion 19j and a wide recessed portion 19k which are positioned immediately below and above the photographic aperture 19i, respectively. The disk-shaped flange portion 19a is provided on one side (left side as viewed in FIGS. 17 and 18) of the narrow recessed portion 19j with an arc-shaped slot (through-slot) 19m. The narrow recessed portion 19j is formed as a bottomed curved groove (recess) shaped to correspond to the moving path of the cylindrical lens holder portion 40a of the third lens group frame 40 when the third lens group frame 40 swings about the pivot shaft 41 between the photographing position and the radially retracted position thereof, and the rear end of the cylindrical lens holder portion 40a remains positioned in the narrow recessed portion 19j regardless of the rotational position of the third lens group frame 40. The rear end of the cylindrical lens holder portion 50a of the second lens group frame 50 can enter the wide recessed portion 19k when the second lens group frame 50 has been rotated to the radially retracted position. The third lens group frame 40 is provided with a stop projection (an element of the first photographing position holding device) 40e which projects rearward. The stop projection 40e is inserted into the arc-shaped slot 19m. The arc-shaped slot 19m corresponds to the moving path of the stop projection 40e when the third lens group frame 40 swings about the pivot shaft 41 between the photographing position and the radially retracted position thereof. The third lens group frame 40 is held in the photographing position thereof by the engagement of the stop projection 40e with one end (an element of the first photographing position holding device; the upper end as viewed in FIGS. 15 and 16) of the arc-shaped slot 19m as shown in FIG. 15.

The second lens group support ring 20 is provided in the disk-shaped flange portion 20a with a wide through-hole 20i which extends upward from a central portion of the disk-shaped flange portion 20a through which the photographing optical axis ZP passes and in which the cylindrical lens holder portion 50a of the second lens group frame 50 can be inserted. The second lens group support ring 20 is provided, in the disk-shaped flange portion 19a below the wide through-hole 20i, with a narrow through-hole 20j in which the cylindrical lens holder portion 40a can be inserted. The wide through-hole 20i and the narrow through-hole 20j are communicatively connected with each other. The wide through-hole 20i is formed as a through-hole shaped to correspond to the moving path of the second lens group frame 50 when the second lens group frame 50 swings about the pivot shaft 51 between the photographing position and the radially retracted position thereof, and the cylindrical lens holder portion 50a remains positioned in the wide through-hole 20i regardless of the rotational position of the second lens group frame 50. The rear end of the cylindrical lens holder portion 50a is positioned slightly behind the rear surface of the disk-shaped flange portion 20a in the optical axis direction when in the radially retracted position thereof (see FIG. 2).

The second lens group frame 50 is provided with a stop projection (an element of the second photographing position holding device) 50e which projects radially outwards from the cylindrical lens holder portion 50a. The second lens group frame 50 is held in the photographing position thereof by the engagement of the stop projection 50e with a position-control boss (an element of the second photographing position holding device) 20k provided on the second lens group support ring 20 as shown in FIG. 15.

Operations of the zoom lens 11 that has the above described structure will be discussed hereinafter. Upon a main switch (not shown) of the digital camera being turned ON in the fully retracted state of the zoom lens 11 shown in FIG. 2, the aforementioned zoom motor is driven to rotate in a lens barrel advancing direction. This rotation of the zoom motor rotates the zoom gear 31. The rotation of the zoom gear 31 causes the helicoid ring 13 and the first movable barrel 14 to move forward while rotating due to the aforementioned helicoid structure, and further causes the first linear guide ring 15 to move forward linearly with the helicoid ring 13 and the first movable barrel 14. During this movement, the cam ring 17, which rotates via rotation of the first movable barrel 14, moves forward in the optical axis direction by an amount of movement corresponding to the sum of the amount of the forward movement of the first linear guide ring 15 and the amount of the forward movement of the cam ring 17 by a leading structure between the first linear guide ring 15 and the cam ring 17, i.e., by the engagement of the inclined lead slot portions of the plurality of through-slots 15a with the plurality of followers 17a of the cam ring 17, respectively.

In the fully retracted state of the zoom lens 11 shown in FIG. 2, the second lens group frame 50 that is positioned inside the second lens group support ring 20 is held in the radially retracted position thereof (where the optical axis of the second lens group LG2 is aligned with the retracted optical axis ZR-2) positioned above the photographing optical axis ZP via the position-control cam projection 54 that projects from the third lens group support ring 19, while the third lens group frame 40 that is positioned inside the third lens group support ring 19 is held in the radially retracted position thereof (where the optical axis of the third lens group LG3 is aligned with the retracted optical axis ZR-3) positioned below the photographing optical axis ZP via the position-control cam projection 44 that projects from the second lens group support ring 20 (see FIGS. 16, 18 and 20). In this state, the second lens group LG2 and the third lens group LG3 are positioned adjacent to each other in a plane orthogonal to the photographing optical axis ZP. At this time, a rotation of the cam ring 17 causes each of the second lens group support ring 20 and the third lens group support ring 19, which are positioned inside the cam ring 17 and guided linearly in the optical axis direction via the second linear guide ring 18, to move in the optical axis direction with respect to the cam ring 17 in a predetermined moving manner due to the engagement of the plurality of first inner cam grooves 17b with the plurality of first cam followers 20e and the engagement of the plurality of second inner cam grooves 17c with the plurality of first cam followers 19e, respectively. When the zoom lens 11 is driven to extend forward from the fully retracted position, the second lens group support ring 20 and the third lens group support ring 19 are moved in directions away from each other. Consequently, during the advancing movement of the third lens group support ring 19 to the zooming range thereof, the third lens group frame 40 is disengaged from the position-control cam projection 44 and rotates about the pivot shaft 41 from the radially retracted position to the photographing position, in which the optical axis of the third lens group LG3 coincides with the photographing optical axis ZP, by the biasing force of the third lens group biasing spring 43 (see FIGS. 15 and 19); and during the concurrent advancing movement of the second lens group support ring 20 to the zooming range thereof, the second lens group frame 50 is disengaged from the position-control cam projection 54 and rotates about the pivot shaft 51 from the radially retracted position to the photographing position, in which the optical axis of the second lens group LG2 coincides with the photographing optical axis ZP, by the biasing force of the second lens group biasing spring 53 (see FIGS. 15 and 17). Thereafter, the third lens group frame 40 and the second lens group frame 50 remain held at the respective photographing positions thereof until the zoom lens 11 is retracted again.

In addition, a rotation of the cam ring 17 causes the first lens group support ring 21, which is positioned around the cam ring 17 and guided linearly in the optical axis direction via the second movable barrel 16, to move in the optical axis direction relative to the cam ring 17 in a predetermined moving manner due to the engagement of the plurality of cam followers 21a with the plurality of outer cam grooves 17d, respectively.

Accordingly, an axial position of the first lens group LG1 relative to the imaging plane (imaging surface/light receiving surface of the CCD image sensor 22) when the first lens group LG1 is moved forward from the fully-retracted position is determined by the sum of the amount of forward movement of the cam ring 17 relative to the stationary barrel 12 and the amount of movement of the first lens group support ring 21 relative to the cam ring 17, and an axial position of the second lens group LG2 relative to the imaging plane when the second lens group LG2 is moved forward from the fully-retracted position is determined by the sum of the amount of forward movement of the cam ring 17 relative to the stationary barrel 12 and the amount of movement of the second lens group support ring 20 relative to the cam ring 17. Likewise, an axial position of the third lens group LG3 relative to the imaging plane when the third lens group LG3 is moved forward from the fully-retracted position is determined by the sum of the amount of forward movement of the cam ring 17 relative to the stationary barrel 12 and the amount of movement of the third lens group support ring 19 relative to the cam ring 17. A zooming operation is carried out by moving the first, second and third lens groups LG1, LG2 and LG3 on the photographing optical axis ZP while changing the air distances therebetween. When the zoom lens 11 is driven to advance from the fully-retracted position shown in FIG. 2, the zoom lens 11 firstly moves to a position shown above the photographic lens axis ZP in FIG. 1 in which the zoom lens 11 is at the wide-angle extremity. The zoom lens 11 moves to a position shown below the photographic lens axis ZP in FIG. 1 in which the zoom lens 11 is at the telephoto extremity by a further rotation of the zoom motor in a lens barrel advancing direction thereof. As can be seen from FIG. 1, when the zoom lens 11 is at the telephoto extremity, the space between the first and second lens groups LG1 and LG2 is great and the space between the second and third lens groups LG2 and LG3 is small. On the other hand, when the zoom lens 11 is at the wide-angle extremity, the first and second lens groups LG1 and LG2 have moved to approach each other by an axial air-distance therebetween which is smaller than that in the zoom lens 11 at the telephoto extremity, while the second and third lens groups LG2 and LG3 have moved away from each other by an axial air-distance therebetween which is greater than that in the zoom lens 11 at the telephoto extremity. The variation of the axial air-distances between the first and second lens groups LG1 and LG2 and between the second and third lens groups LG2 and LG3 for the zooming operation are achieved by contours of the plurality of outer cam grooves 17d (for moving the first lens group LG1) and the plurality of first inner cam grooves 17b (for moving the second lens group LG2) and contours of the plurality of first inner cam grooves 17b (for moving the second lens group LG2) and the plurality of second inner cam grooves 17c (for moving the third lens group LG3).

In a ready-to-photograph state of the zoom lens 11 between the wide-angle extremity and the telephoto extremity, a focusing operation is carried out by moving the fourth lens group LG4 along the photographing optical axis ZP by driving the aforementioned AF motor in accordance with object distance information obtained by a distance measuring device (not shown) of the digital camera.

Upon the main switch being turned OFF, the zoom motor is driven to rotate in a lens barrel retracting direction so that the zoom lens 11 operates in the reverse manner to the above described advancing operation to be fully retracted as shown in FIG. 2. During this retracting movement of the zoom lens 11, the third lens group frame 40 rotates about the pivot shaft 41 to the radially retracted position (see FIG. 20) while moving rearward with the third lens group support ring 19, and the second lens group frame 50 concurrently rotates about the pivot shaft 51 to the radially retracted position (see FIG. 18) while moving rearward with the second lens group support ring 20. These radially retracting operations of the third lens group frame 40 and the second lens group frame 50 upon the main switch being turned OFF will be discussed in detail with reference to FIGS. 5 through 7.

Figure 5:
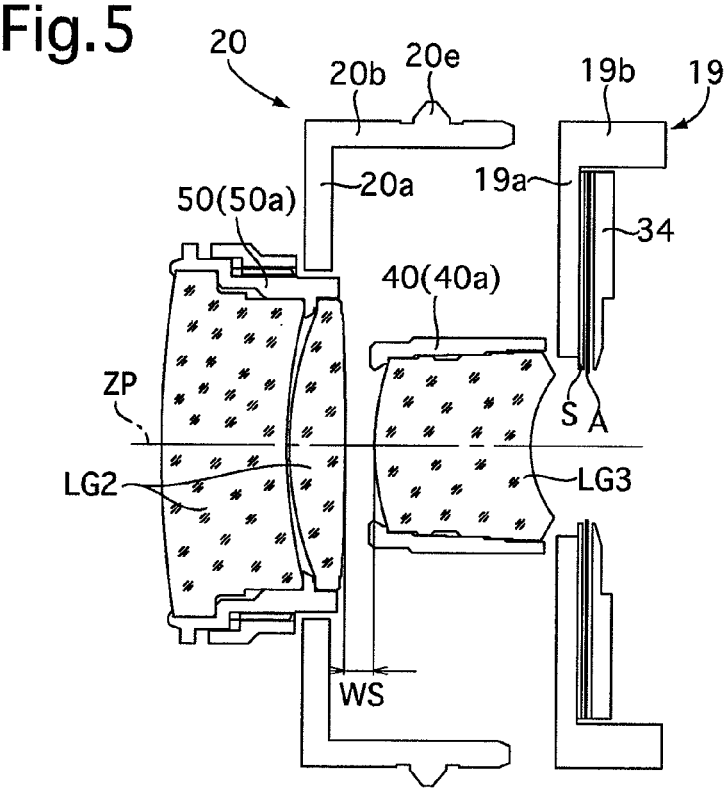
FIG. 5 is a longitudinal sectional view of the second lens group, the third lens group, the second lens group support ring and the third lens group support ring showing the relative positions thereof in a state immediately before the second lens group and the third lens group are rotated to be retracted to the radially retracted positions thereof in between a ready-to-photograph state and the fully retracted state of the zoom lens.
Figure 6:
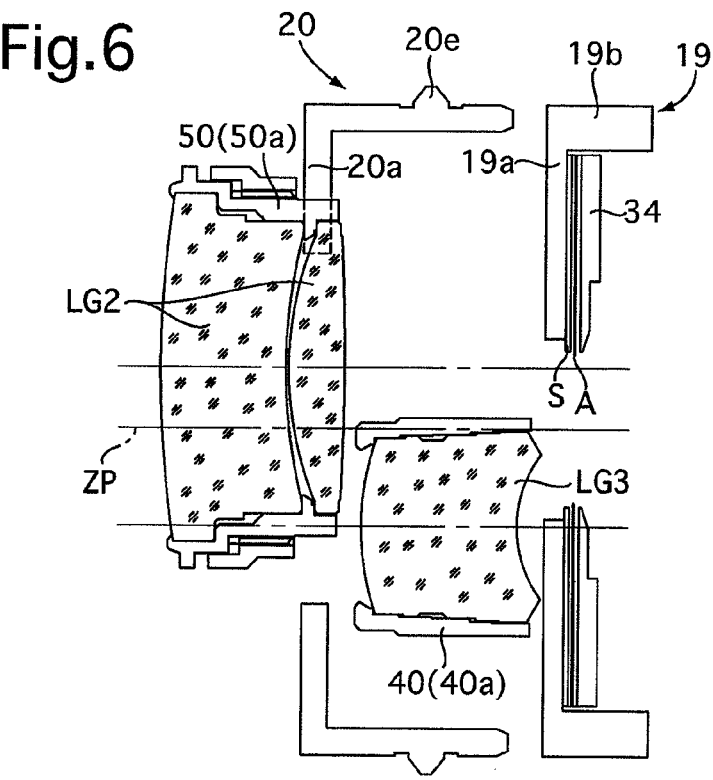
FIG. 6 is a longitudinal sectional view of the second lens group and the third lens group, showing the relative positions thereof, in a state where the second lens group and the third lens group are being rotated so as to be retracted to the respective radially retracted positions thereof in between a ready-to-photograph state and the fully retracted state of the zoom lens.

FIG. 5 shows the relative position between the second lens group LG2 and the third lens group LG3 and the relative position between the third lens group support frame 19 and the second lens group support ring 20 immediately before the aforementioned rotations of the second lens group LG2 and the third lens group LG3 to the respective radially retracted positions thereof are performed during the retracting movement of the zoom lens 11 from a ready-to-photograph state to the fully retracted state. In a ready-to-photograph state of the zoom lens 11 from the wide-angle extremity to the telephoto extremity, the second lens group LG2 and the third lens group LG3 are not brought as close to each other as the distance "WS" therebetween in the optical axis direction shown in FIG. 5. In other words, the distance between the second lens group LG2 and the third lens group LG3 is greater than the distance WS shown in FIG. 5 at all times in a ready-to-photograph state of the zoom lens 11 from the wide-angle extremity to the telephoto extremity.

When the zoom lens 11 is driven to retract from the wide-angle extremity toward the fully retracted position, the third lens group support ring 19 and the second lens group support ring 20 approach each other in the optical axis direction in accordance with contours of the plurality of second inner cam grooves 17c and contours of the plurality of first inner cam grooves 17b, respectively. Namely, the third lens group frame 40, which is supported by the third lens group support ring 19, and the second lens group support ring 20 approach each other while the second lens group frame 50, which is supported by the second lens group support ring 20, and the third lens group support frame 19 approach each other. Thereupon, the position-control cam projection 54 of the third lens group support ring 19 comes into contact with the cam-contacting portion 50d, and the second lens group frame 50 starts being rotated toward the radially retracted position (upward) against the biasing force of the second lens group biasing spring 53 in accordance with the relatively approaching operations of the third lens group support ring 19 and the second lens group support ring 20; and the position-control cam projection 44 of the second lens group support ring 20 concurrently comes into contact with the contacting portion 40d, and the third lens group frame 40 starts being rotated toward the radially retracted position (downward) against the biasing force of the third lens group biasing spring 43 in accordance with the relatively approaching operations of the third lens group support ring 19 and the second lens group support ring 20.

Figure 7:
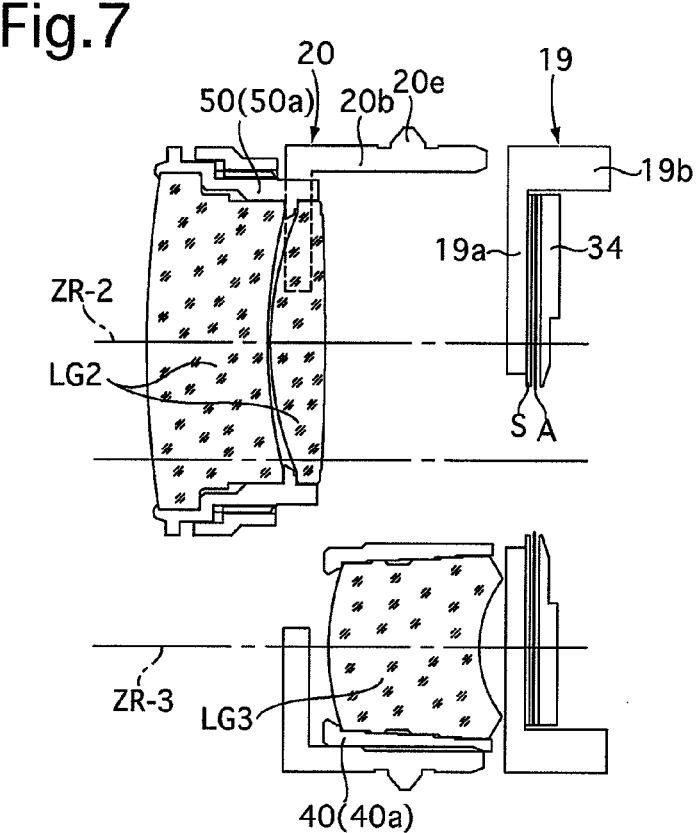
FIG. 7 is a longitudinal sectional view of the second lens group and the third lens group showing the relative positions thereof, in a state where the second lens group and the third lens group are further moved rearward in the optical axis direction from the positions shown in FIG. 6 and have been retracted to respective radially retracted positions thereof (zoom lens not yet fully retracted)

FIG. 7 shows a state where the third lens group frame 40 and the second lens group frame 50 have been rotated to respective radially retracted positions thereof (however, the zoom lens 11 is not yet fully retracted). As mentioned above, the third lens group frame 40 and the second lens group frame 50 are retracted to the respective radially retracted positions thereof from the photographing optical axis ZP in such a manner that the second lens group LG2 (the cylindrical lens holder portion 50a of the second lens group frame 50) occupies (overlaps) a part of an area which would be occupied by the third lens group LG3 (the cylindrical lens holder portion 40a of the third lens group frame 40) if the third lens group LG3 was in a ready-to-photograph state of the zoom lens 11 as shown in FIG. 15, as viewed from the front of the zoom lens 11 and that the third lens group LG3 (the cylindrical lens holder portion 40a of the third lens group frame 40) occupies (overlaps) a part of an area which would be occupied by the second lens group LG2 (the cylindrical lens holder portion 50a of the second lens group frame 50) if the second lens group LG2 was in a ready-to-photograph state of the zoom lens 11 as shown in FIG. 15, as viewed from the front of the zoom lens 11. In other words, the second lens group LG2 and the third lens group LG3 are retracted to the respective radially retracted positions thereof from the photographing optical axis ZP while giving way to each other.

Although the second lens group LG2 and the third lens group LG3 gradually approach each other in the optical axis direction during the retracting/rotating operations of the third lens group frame 40 and the second lens group frame 50, the contours of the plurality of first inner cam grooves 17b and the plurality of second inner cam grooves 17c and others are predetermined so that the second lens group LG2 and the third lens group LG3 are moved to the respective radially retracted positions thereof before interfering with each other (before coming into contact with each other). Each of the timing of the completion (or commencement) of rotation of the third lens group frame 40 to the radially retracted position thereof and the timing of the completion (or commencement) of rotation of the second lens group frame 50 to the radially retracted position thereof can be freely determined within a range in which the second lens group LG2 and the third lens group LG3 do not interfere with each other. For instance, the zoom lens 11 can be configured so that the third lens group frame 40 and the second lens group frame 50 commence to rotate from the respective photographing positions to the respective radially retracted positions thereof either simultaneously or at different timings from each other. The third lens group frame 40 having been rotated to the radially retracted position thereof remains held therein by the engagement of the third lens group frame 40 with the position-control cam projection 44 until a subsequent advancing operation of the zoom lens 11 is performed. Similarly, the second lens group frame 50 having been rotated to the radially retracted position thereof remains held therein by the engagement of the second lens group frame 50 with the position-control cam projection 54 until the subsequent advancing operation of the zoom lens 11 is performed.

Figure 8:
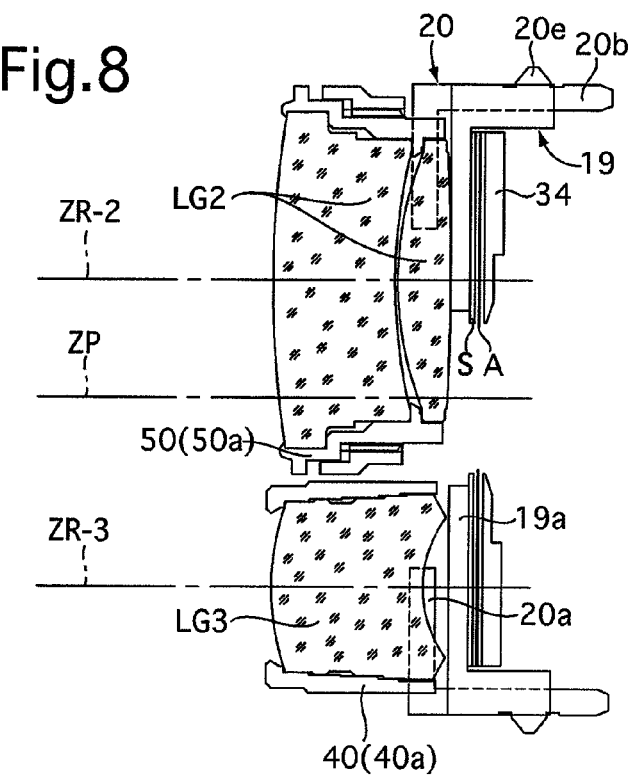
FIG. 8 is a longitudinal sectional view of the second lens group, the third lens group, the second lens group support ring and the third lens group support ring showing the relative positions thereof in the fully retracted state of the zoom lens.
Figure 9:
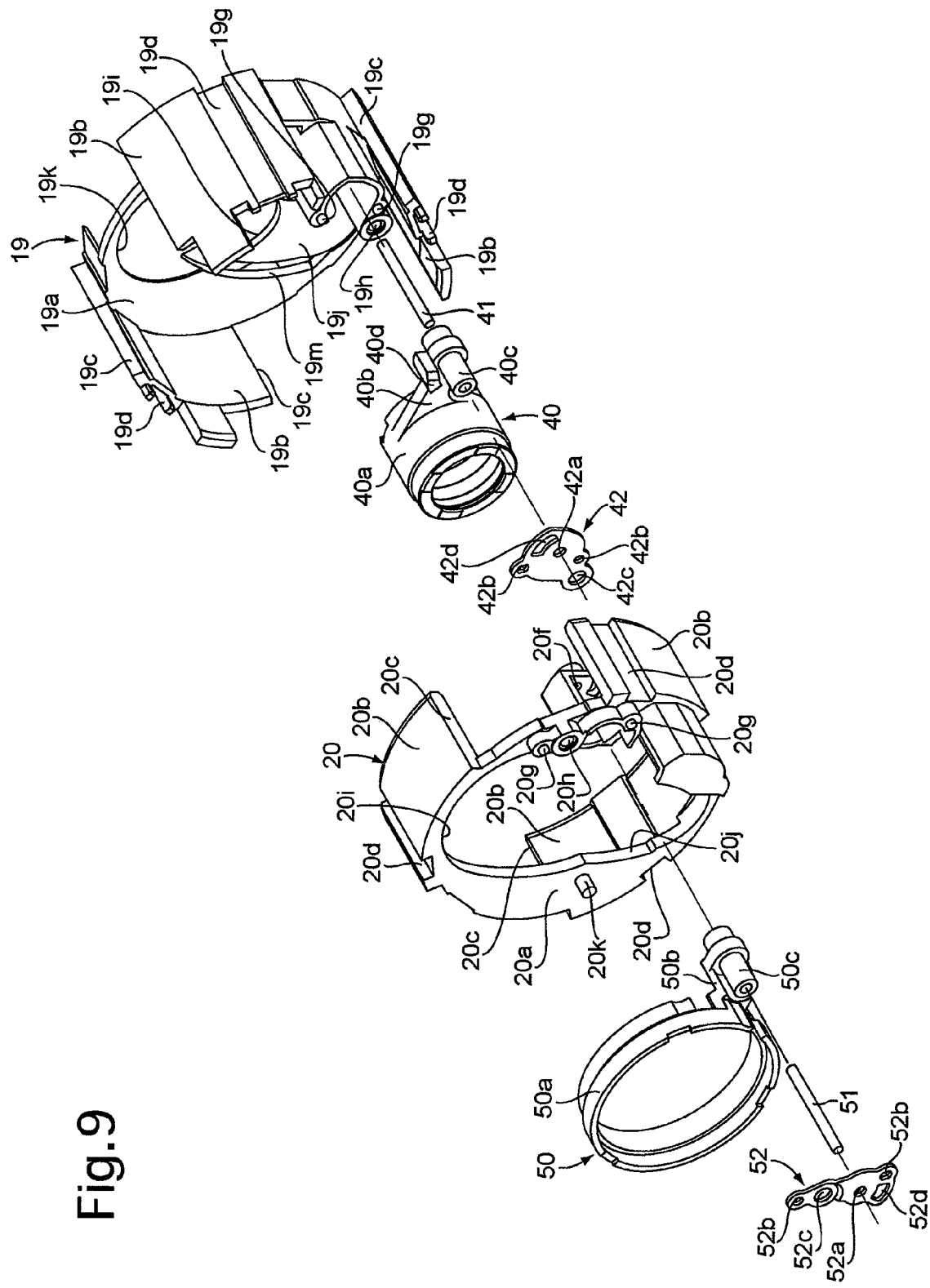
FIG. 9 is an exploded perspective view of the second lens group frame, the second lens group support ring, the third lens group frame and the third lens group support ring in a state where the second lens group frame and the third lens group frame are held in the respective photographing positions thereof.
Figure 10:
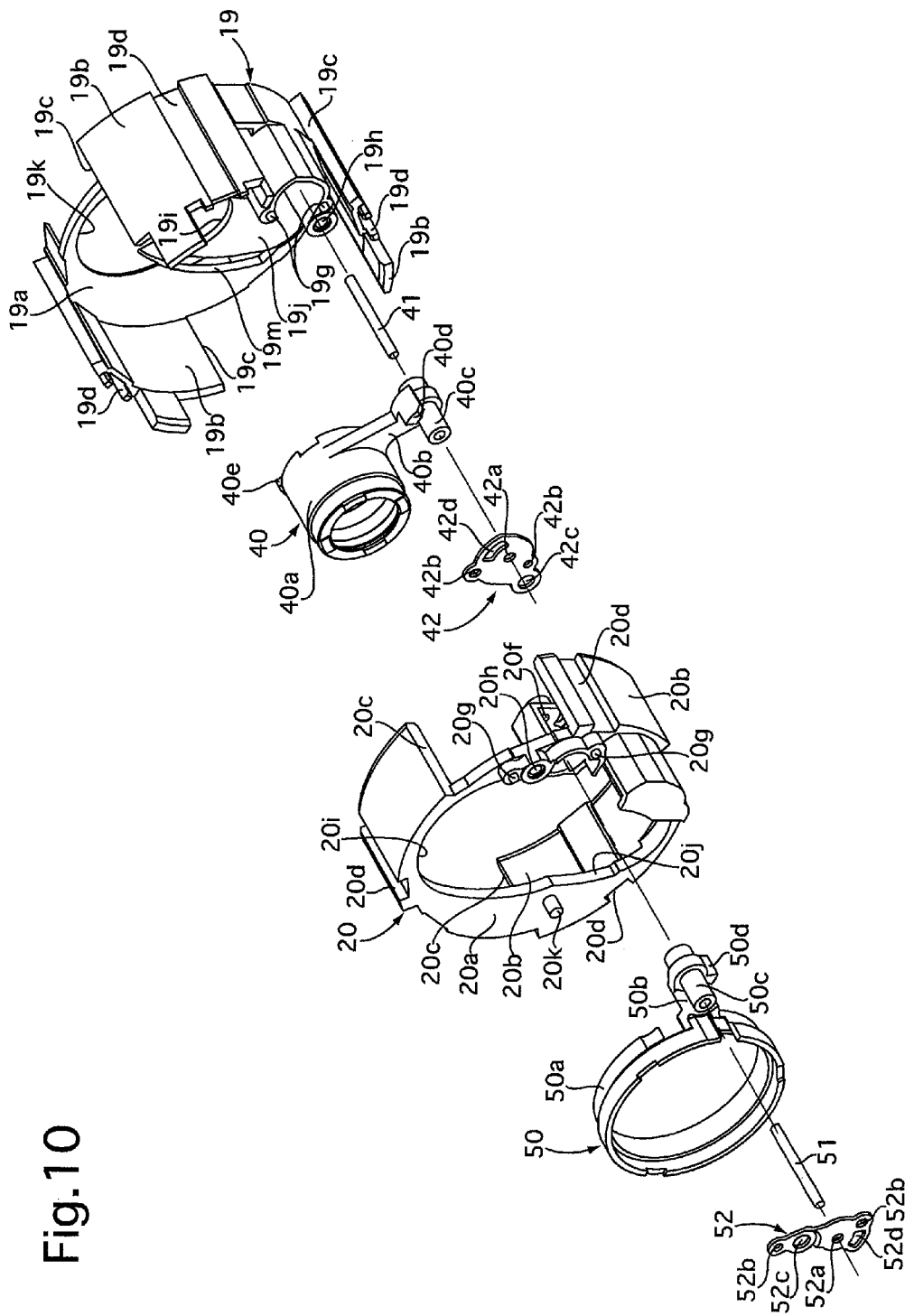
FIG. 10 is a view similar to that of FIG. 9, showing the second lens group frame, the second lens group support ring, the third lens group frame and the third lens group support ring in a state where the second lens group frame and the third lens group frame are held in the respective radially retracted positions thereof.
Figure 11:
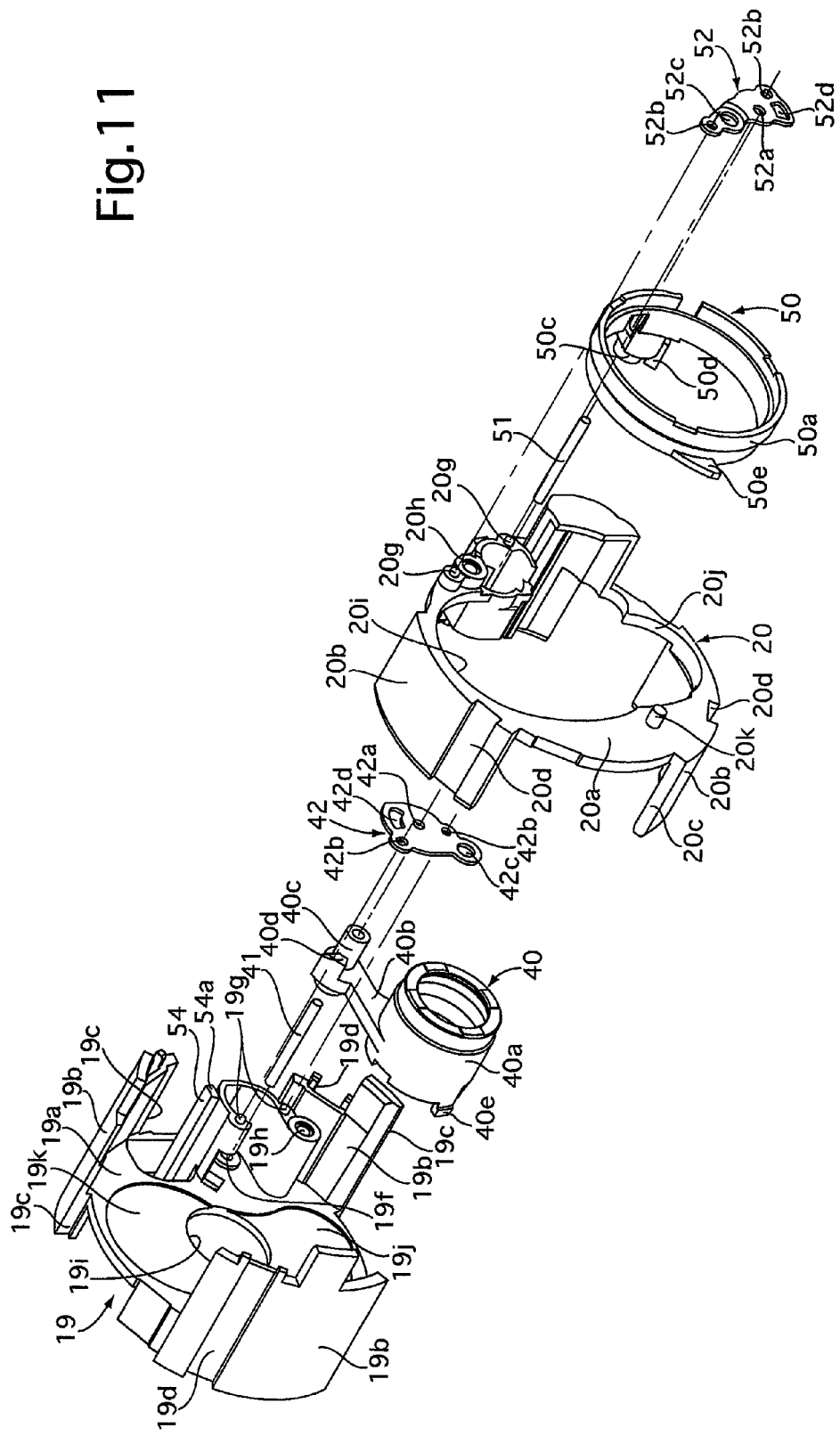
FIG. 11 is an exploded perspective view of the second lens group frame, the second lens group support ring, the third lens group frame and the third lens group support ring in a state where the second lens group frame and the third lens group frame are held in the respective photographing positions thereof, viewed from an angle different from the angle shown in FIG. 9.
Figure 12:
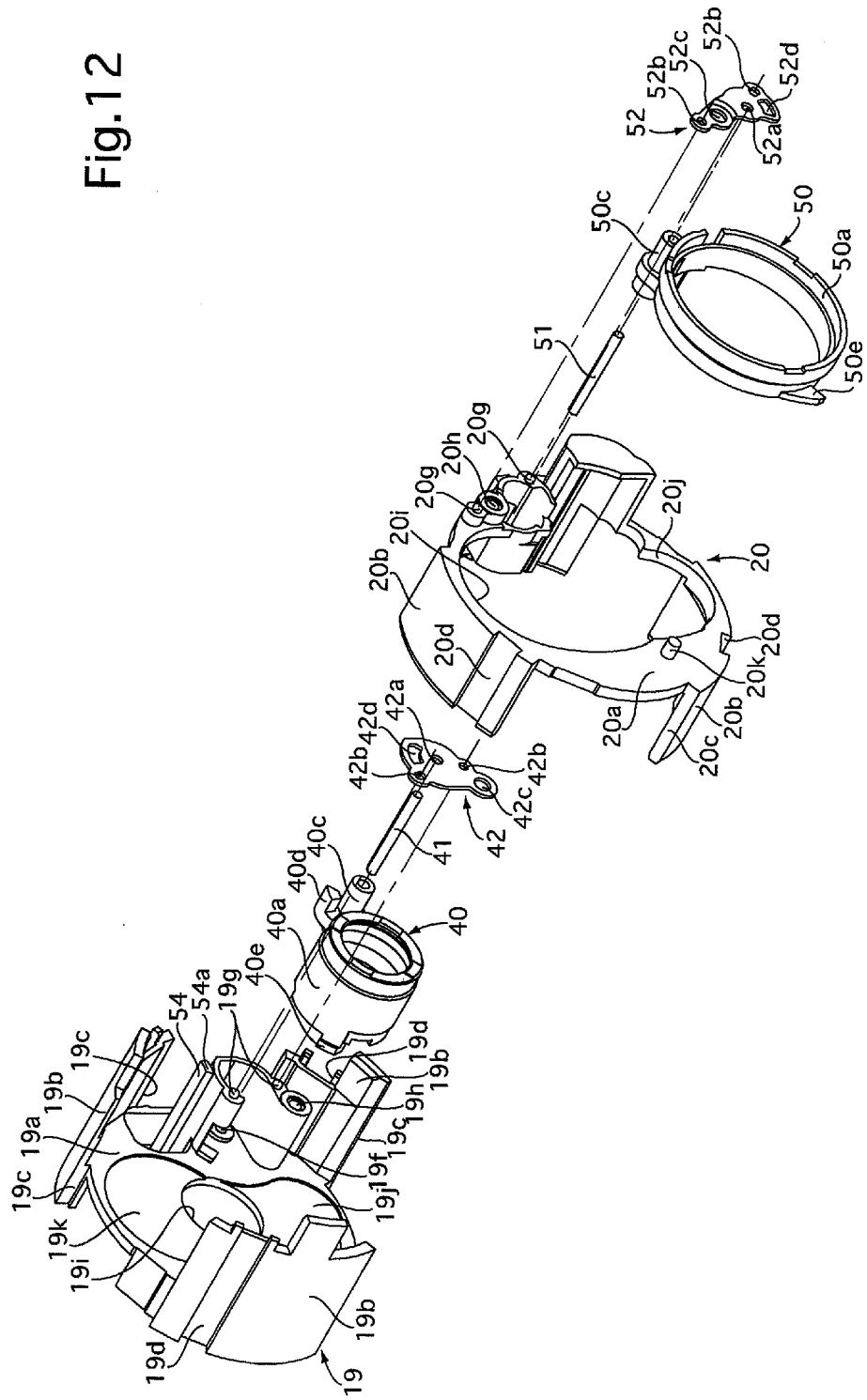
FIG. 12 is an exploded perspective view of the second lens group frame, the second lens group support ring, the third lens group frame and the third lens group support ring in a state where the second lens group frame and the third lens group frame are held in the respective photographing positions thereof, viewed from an angle different from the angle shown in FIG. 10.
Figure 13:
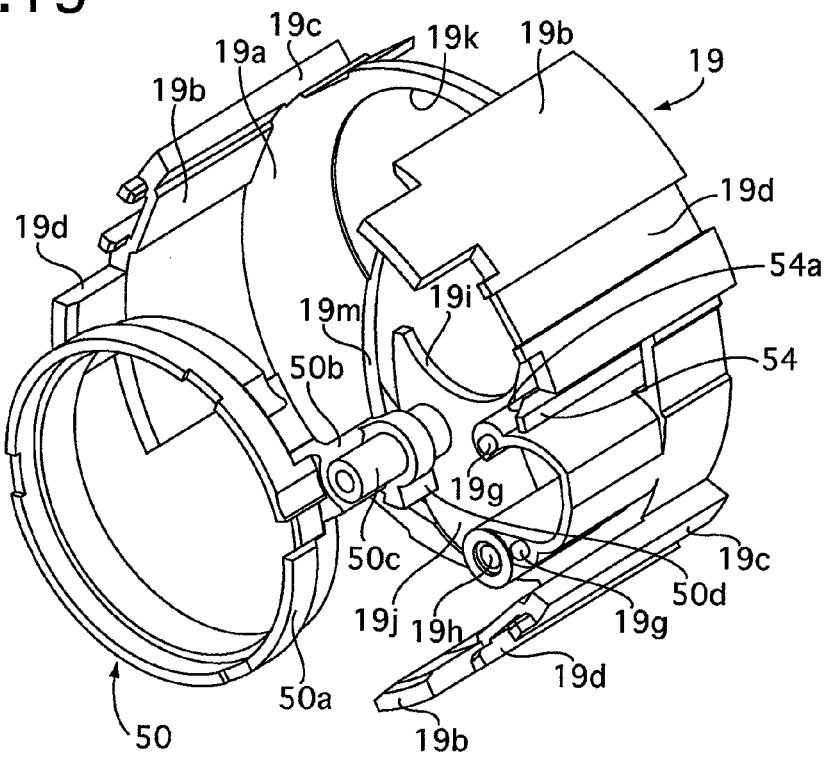
FIG. 13 is an exploded perspective view of the second lens group frame and the third lens group support ring, showing the shape of the retracting cam formed on the third lens group support ring.

In the state shown in FIG. 7, in which the second lens group LG2 and the third lens group LG3 have been retracted to the respective radially retracted positions thereof, the zoom lens 11 has not yet reached the fully retracted state shown in FIG. 2, so that the third lens group support ring 19 and the second lens group support ring 20 further approach each other in the optical axis direction in accordance with the retracting operation of the zoom lens 11. Thereupon, the cylindrical lens holder portion 40a of the third lens group frame 40 held in the radially retracted position enters the narrow through-hole 20j and projects forward from the disk-shaped flange portion 20a. This makes it possible for the second lens group support ring 20 to approach the third lens group support ring 19 to a point where the disk-shaped flange portion 20a is positioned in close vicinity of the disk-shaped flange portion 19a as shown in FIG. 8 without interfering with either the cylindrical lens holder portion 40a or the third lens group LG3. In the state shown in FIG. 8, in which the third lens group support ring 19 and the second lens group support ring 20 are positioned closest to each other, the rear end of the cylindrical lens holder portion 50a of the second lens group frame 50 enters the wide recessed portion 19k. This state shown in FIG. 8 corresponds to the fully retracted state of the zoom lens 11 shown in FIGS. 2 and 4. As can be seen from FIG. 8, the second lens group LG2 and the third lens group LG3 are positioned adjacent to each other in a plane orthogonal to the photographing optical axis ZP (in a diametrical direction of the zoom lens 11 (vertical direction as viewed in FIGS. 8, 15 and 16)) in the fully retracted state of the zoom lens 11. With this configuration, a substantial reduction in length (thickness) of the zoom lens 11 in the optical axis direction in the fully retracted state thereof is made possible.

Specifically, in the present embodiment of the zoom lens, the thicknesses of the second lens group LG2 and the third lens group LG3 in the optical axis direction are substantially the same as each other, the positions of the front ends of the second lens group LG2 and the third lens group LG3 in the optical axis direction are substantially coincident with each other in the fully retracted state of the zoom lens 11, and the positions of the rear ends of the second lens group LG2 and the third lens group LG3 in the optical axis direction are substantially coincident with each other in the fully retracted state of the zoom lens 11. Due to this configuration, the internal space of the zoom lens 11 in the optical axis direction which is occupied by the second lens group LG2 and the third lens group LG3 in the fully retracted state of the zoom lens 11 is substantially half of that in a ready-to-photograph state of the zoom lens 11.

Figure 4:
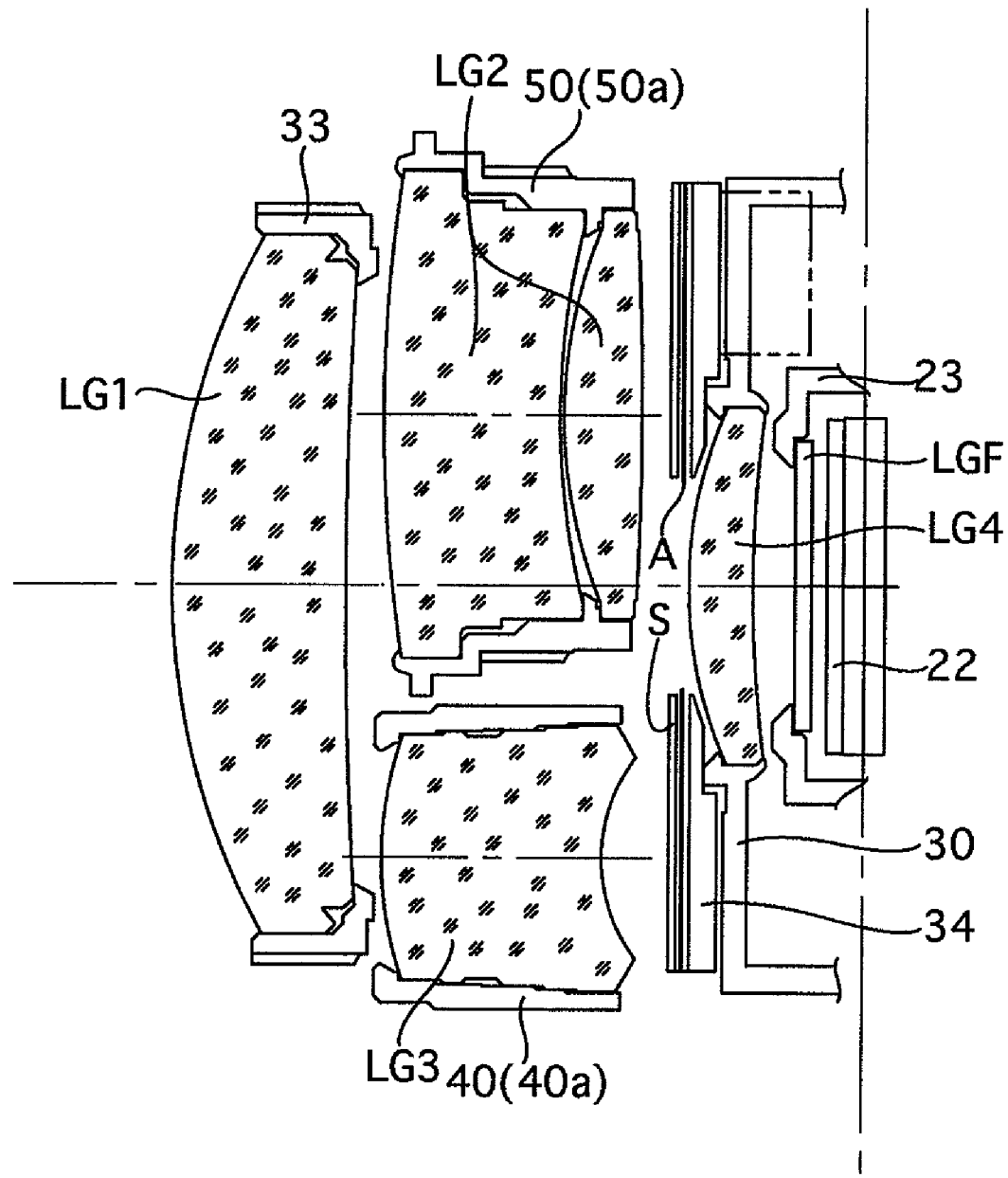
FIG. 4 is a longitudinal sectional view of the optical elements and associated elements thereof shown in FIG. 2, showing the relative positions of the optical elements in the fully retracted state of the zoom lens.

Additionally, as can be seen from FIGS. 2, 4 and 16, the second lens group LG2 and the third lens group LG3 are retracted to the respective radially retracted positions thereof from the photographing optical axis ZP in such a manner that the second lens group LG2 would overlap the third lens group LG3 as viewed from the front of the zoom lens 11 (i.e., in such a manner that the second lens group LG2 and the third lens group LG3 allow room for each other) if the third lens group LG3 was in a ready-to-photograph state of the zoom lens 11, or vice versa. Furthermore, the second lens group LG2 and the third lens group LG3 are positioned adjacent to each other in a diametrical direction of the zoom lens 11 (in a direction in a plane orthogonal to the photographing optical axis ZP) in the fully retracted state of the zoom lens 11. In addition, the sum of the outer diameters of the second lens group LG2 and the third lens group LG3 which are accommodated side by side in a diametrical direction of the zoom lens 11 (in a direction in a plane orthogonal to the photographing optical axis ZP) is substantially the same as the outer diameter of the first lens group LG1 having the largest outer diameter among all the lens groups of the zoom lens 11, and the second lens group LG2 and the third lens group LG3 are accommodated immediately behind the first lens group LG1 so as to fit (be accommodated) behind the first lens group LG1 (so as to be hidden behind the first lens group LG1 as viewed from the front of the zoom lens 11) in the fully retracted state of the zoom lens 11. Namely, with respect to the radial space about the photographing optical axis ZP, since the second lens group LG2 and the third lens group LG3 are accommodated substantially within the range of the outer diameter of the first lens group LG1 that does not radially retract from the photographing optical axis ZP, the maximum diameter of the optical system of the zoom lens 11 does not increase when the zoom lens 11 is fully retracted even if the second lens group LG2 and the third lens group LG3 are accommodated so that the second lens group LG2 is positioned immediately above the third lens group LG3 in a diametrical direction of the zoom lens 11. Additionally, since the second lens group LG2 and the third lens group LG3 are retracted to the respective radially retracted positions thereof while giving way to each other, a reduction in amount of retracting movement of each of the second lens group LG2 and the third lens group LG3 with respect to the photographing optical axis ZP is achieved. Accordingly, the mechanism of the zoom lens 11 for accommodating the lens groups thereof when the zoom lens 11 is fully retracted is compact and consumes considerably less space not only in the optical axis direction but also in radial directions of the zoom lens 11.

During the retracting/rotating operations of the third lens group frame 40 and the second lens group frame 50, the cam ring 17 moves rearward in the optical axis direction, and the third lens group support ring 19 and the second lens group support ring 20 that are supported by the cam ring 17 move rearward as a whole in the optical axis direction while approaching each other. Subsequently, when the zoom lens 11 enters the fully retracted state shown in FIG. 2, the first movable barrel 14, the first linear guide ring 15, the second movable barrel 16, the cam ring 17 and the first lens group support ring 21 are concentrically positioned to be layered in radial directions of the zoom lens 11 to thereby reduce the length of the zoom lens 11. Not only is the second lens group LG2 positioned above the third lens group LG3 in a diametrical direction of the zoom lens 11 to thereby achieve a reduction in thickness of the zoom lens 11 in this fully retracted state as described above, the first lens group LG1 and the fourth lens group LG4 are also positioned close to the second lens group LG2 and the third lens group LG3 as can be seen from FIGS. 2 and 4, so that all the elements of the zoom lens system are accommodated in a compact and space-saving fashion.

Figure 21:
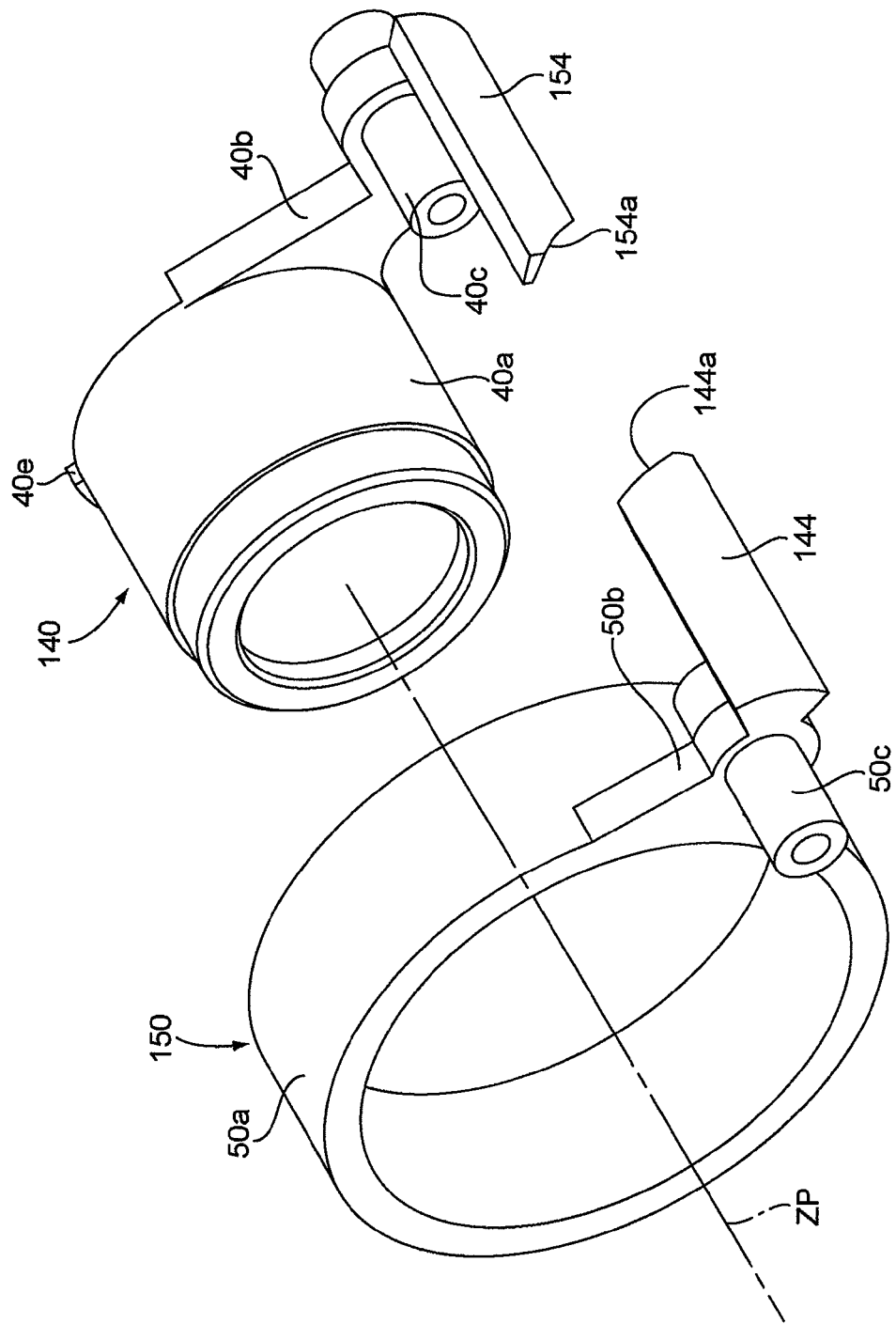
FIG. 21 is a perspective view of the second lens group frame and the third lens group frame in which two position-control cam projections are integrally formed, respectively, of another embodiment of the retracting device of the zoom lens.
Figure 22:
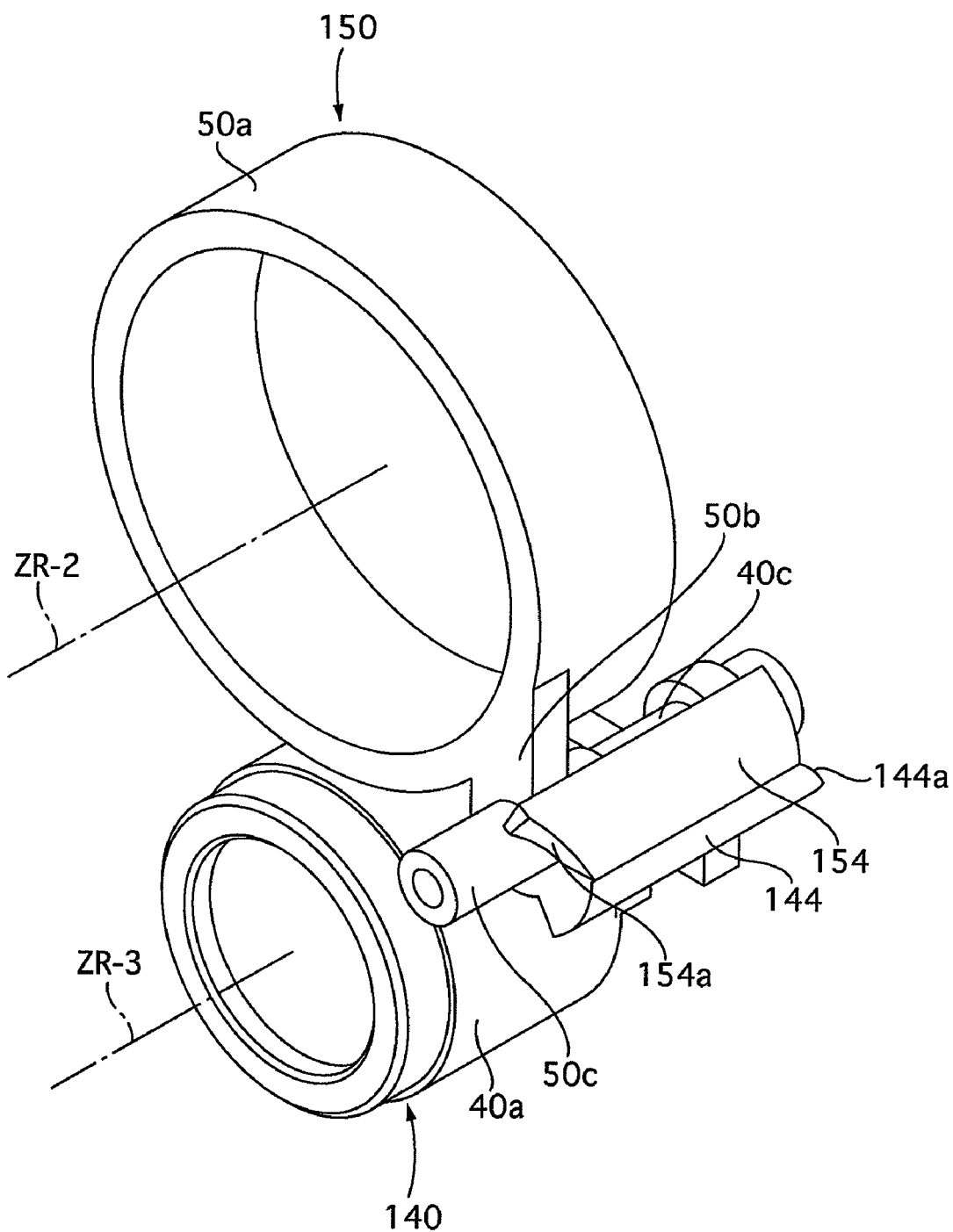
FIG. 22 is a perspective view of the second lens group frame and the third lens group frame which are shown in FIG. 21 and illustrates a state where the second lens group frame and the third lens group frame have been rotated to the respective radially retracted positions thereof by control of the position-control cam projections.

The above illustrated embodiment of the zoom lens 11 includes the position-control cam projection 54 of the third lens group support ring 19 and the position-control cam projection 44 of the second lens group support ring 20 as elements of a retracting device for rotating the third lens group support frame 40 and the second lens group support frame 50 to the respective radially retracted position thereof. However, it is possible that such elements be provided at positions different from the above illustrated positions. FIGS. 21 and 22 show another embodiment of the second lens group frame and the third lens group frame with which two position-control cam projections which correspond to the position-control cam projections 44 and 54 are integrally formed, respectively, showing another embodiment of the retracting device of the zoom lens 11. In this embodiment, a third lens group support frame 140 and a second lens group support frame 150 are provided with position-control cam projections 144 and 154 serving as elements of the retracting device which correspond to the position-control cam projections 44 and 54, respectively. In this embodiment shown in FIGS. 21 and 22, instead of the position-control cam projections 44 and 54 in the previous embodiment of the zoom lens 11, a position-control cam projection 144 and a position-control cam projection 154 are integrally formed with the second lens group frame 150 and the third lens group frame 140 to project rearward and forward in the optical axis direction, respectively. The second lens group support frame 150 and the third lens group support frame 140 correspond to the second lens group support frame 50 and the third lens group support frame 40 of the previous embodiment of the zoom lens 11, respectively, and portions of the second lens group support frame 150 and the third lens group support frame 140 which are similar to those of the second lens group support frame 50 and the third lens group support frame 40 are designated by the same reference numerals and the descriptions of such portions are omitted from the following description.

In a ready-to-photograph state of the zoom lens 11, the second lens group frame 150 and the third lens group frame 140 maintain the relative positions thereof shown in FIG. 21 in which the second lens group frame 150 and the third lens group frame 140 are positioned away from each other in the optical axis direction and aligned with the photographing optical axis ZP, and the optical axes of the second lens group (not shown in FIGS. 21 and 22) and the third lens group (not shown in FIGS. 21 and 22) which are respectively held by the cylindrical lens holder portions 50a and 40a of the second lens group frame 150 and the third lens group frame 140 are coincident with the photographing optical axis ZP. When the zoom lens 11 moves from a ready-to-photograph state to the fully retracted state, the second lens group frame 150 and the third lens group frame 140 are moved relative to each other in directions to approach each other. Thereupon, the position-control cam projection 144 that projects rearward from the second lens group frame 150 and the position-control cam projection 154 that projects forward from the third lens group frame 140 approach each other, and a lens-retracting cam surface 144a and a lens-retracting cam surface 154a which are formed at the rear end (free end) of the position-control cam projection 144 and the front end (free end) of the position-control cam projection 154 come into contact with each other. The lens-retracting cam surface 144a and the lens-retracting cam surface 154a are shaped to give each of the second lens group frame 150 and the third lens group frame 140 a component force in a direction toward the radially retracted position thereof in accordance with the relative approaching movements of the second lens group frame 150 and the third lens group frame 140 in the optical axis direction. Therefore, in accordance with the shapes of the lens-retracting cam surface 144a and the lens-retracting cam surface 154a, the second lens group frame 150 and the third lens group frame 140 are rotated clockwise and counterclockwise as viewed from the front of the zoom lens 11 to move upward and downward relative to the photographing optical axis ZP, respectively, so that the zoom lens 11 can be fully retracted with the cylindrical lens holder portions 50a being positioned immediately above the cylindrical lens holder portions 40a in a diametrical direction of the zoom lens 11 as shown in FIG. 22. In a state where the second lens group frame 150 and the third lens group frame 140 have been rotated to the respective radially retracted positions thereof, side surfaces of the position-control cam projections 144 and 154 are in contact with each other to hold the second lens group frame 150 and the third lens group frame 140 in the respective radially retracted positions thereof.

Although the present invention has been described based on the above illustrated embodiments, the present invention is not limited solely to these particular embodiments. For instance, although the second lens group and the third lens group are radially retractable lens groups in a zoom lens system consisting of four lens groups in the above illustrated embodiment of the zoom lens, the present invention can also be applied to another type of retractable photographic lens having a different lens system arrangement.

Furthermore, as described above, although the second lens group LG2 is positioned above the third lens group LG3 in a diametrical direction of the zoom lens 11 to thereby achieve a reduction in thickness of the zoom lens 11 in the fully retracted state, the third lens group LG3 can be alternatively positioned above the second lens group LG2 in a diametrical direction of the zoom lens 11 to thereby achieve a reduction in thickness of the zoom lens 11 in the fully retracted state.

Obvious changes may be made in the specific embodiments of the present invention described herein, such modifications being within the spirit and scope of the invention claimed. It is indicated that all matter contained herein is illustrative and does not limit the scope of the present invention.

What is claimed:

1. A retractable photographic lens including a photographing optical system comprising:
    a plurality of optical elements including at least two radially-retractable optical elements;
    wherein said plurality of optical elements are aligned with an optical axis in an operating state of said retractable photographic lens, and
    wherein, when said retractable photographic lens moves from said operating state to a fully retracted state, said two radially-retractable optical elements of said plurality of optical elements are radially retracted to respective radially retracted positions away from said optical axis in different radial directions and are moved rearward in said optical axis direction to be positioned adjacent to each other in a plane orthogonal to said optical axis without an intervening optical element positioned between the two radially-retractable optical elements.

2. The retractable photographic lens according to claim 1, further comprising:
    a first optical-axis-direction moving ring and a second optical-axis-direction moving ring which move rearward in said optical axis direction at least when said retractable photographic lens moves from said operating state to said fully retracted state;
    a first radially-retractable-optical-element holding member which is supported by said first optical-axis-direction moving ring to be movable along a plane orthogonal to said optical axis and holds one of said two radially-retractable optical elements;
    a second radially-retractable-optical-element holding member which is supported by said second optical-axis-direction moving ring to be movable along a plane orthogonal to said optical axis and holds the other of said two radially-retractable optical elements;
    a photographing position holding device which holds said first radially-retractable-optical-element holding member and said second radially-retractable-optical-element holding member so that said two radially-retractable optical elements are aligned with said optical axis in said operating state of said retractable photographic lens; and
    a retracting device which moves said two radially-retractable optical elements toward said radially retracted positions thereof in accordance with movements of said first optical-axis-direction moving ring and said second optical-axis-direction moving ring when said retractable photographic lens moves from said operating state to said fully retracted state.

3. The retractable photographic lens according to claim 2, wherein said first optical-axis-direction moving ring and said second optical-axis-direction moving ring approach each other so as to reduce a distance therebetween in said optical axis direction when said retractable photographic lens moves from said operating state to said fully retracted state, wherein said retracting device comprises:
   a first cam mechanism which includes first two contacting portions formed on said second optical-axis-direction moving ring and said first radially-retractable-optical-element holding member, respectively, and gives said first radially-retractable-optical-element holding member a component force in a direction to move said one of said two radially-retractable optical elements toward associated one of said radially retracted positions upon said first two contacting portions coming in contact with each other when said first optical-axis-direction moving ring and said second optical-axis-direction moving ring approach each other; and
   a second cam mechanism which includes second two contacting portions formed on said first optical-axis-direction moving ring and said second radially-retractable-optical-element holding member, respectively, and gives said second radially-retractable-optical-element holding member a component force in a direction to move said other of said two radially-retractable optical elements toward associated the other of said radially retracted positions upon said second two contacting portions coming in contact with each other when said first optical-axis-direction moving ring and said second optical-axis-direction moving ring approach each other.

4. The retractable photographic lens according to claim 2, wherein said first optical-axis-direction moving ring and said second optical-axis-direction moving ring approach each other so as to reduce a distance therebetween in said optical axis direction when said retractable photographic lens moves from said operating state to said fully retracted state, wherein said retracting device comprises:
   a cam mechanism which includes two contacting portions formed on said first radially-retractable-optical-element holding member and said second radially-retractable-optical-element holding member, respectively, and gives each of said first radially-retractable-optical-element holding member and said second radially-retractable-optical-element holding member a component force in a direction to move said two radially-retractable optical elements toward said respective radially retracted positions thereof upon said two contacting portions coming in contact with each other when said first optical-axis-direction moving ring and said second optical-axis-direction moving ring approach each other.

5. The retractable photographic lens according to claim 1, wherein said two radially-retractable optical elements having substantially in the same thickness in said optical axis direction, and
   wherein, in said fully retracted state of said retractable photographic lens, positions of front ends of said two radially-retractable optical elements in said optical axis direction are substantially coincident with each other and positions of rear ends of said two radially-retractable optical elements in said optical axis direction are substantially coincident with each other.

6. The retractable photographic lens according to claim 1, wherein each of said two radially-retractable optical elements comprises a radially-retractable lens group, and
   wherein said plurality of optical elements further comprises a large-diameter lens group which remains aligned with said optical axis even in said fully retracted state of said retractable photographic lens, an outer diameter of said large-diameter lens group being substantially identical to the sum of outer diameters of said two radially-retractable lens groups.

7. The retractable photographic lens according to claim 1, wherein said two radially-retractable optical elements are provided adjacent to each other and are positioned between a frontmost lens group and a rearmost lens group of said plurality of optical elements.

8. The retractable photographic lens according to claim 1, wherein said two radially-retractable optical elements are rotated in opposite rotation directions about two pivots, respectively, which extend substantially parallel to said optical axis, when said retractable photographic lens moves from said operating state to said fully retracted state.

9. The retractable photographic lens according to claim 1, wherein said two radially-retractable optical elements are positioned on radially opposite sides with respect to said optical axis, when said retractable photographic lens is in said fully retracted state.

10. The retractable photographic lens according to claim 2, wherein said photographing position holding device comprises:
    a first photographing position holding device including a first stop projection formed on said first radially-retractable-optical-element holding member and a first spring which continuously biases said first radially-retractable-optical-element holding member in a direction to make said first stop projection contact with a portion of said first optical-axis-direction moving ring; and
    a second photographing position holding device including a second stop projection formed on said second radially-retractable-optical-element holding member and a second spring which continuously biases said second radially-retractable-optical-element holding member in a direction to make said second stop projection contact with a portion of said second optical-axis-direction moving ring.

11. The retractable photographic lens according to claim 6, wherein said large-diameter lens group comprises a frontmost lens group.

12. The retractable photographic lens according to claim 6, further comprising a shutter unit including an adjustable diaphragm,
    wherein said two radially-retractable optical elements are positioned immediately in front of said adjustable diaphragm in said fully retracted state of said retractable photographic lens.

13. The retractable photographic lens according to claim 2, wherein each of said first optical-axis-direction moving ring and said second optical-axis-direction moving ring is guided linearly along said optical axis without rotating.

14. The retractable photographic lens according to claim 1, wherein said retractable photographic lens is a zoom lens, said two radially-retractable optical elements being moved in said optical axis direction when a zooming operation is carried out.

15. A retractable photographic lens including a photographing optical system comprising:
    a plurality of optical elements aligned with an optical axis in an operating state of said retractable photographic lens,
    wherein, when said retractable photographic lens moves from said operating state to a fully retracted state, at least two radially-retractable optical elements of said plurality of optical elements are moved away from each other in directions orthogonal to said optical axis so that one of said two radially-retractable optical elements occupies a part of an area which is occupied by the other of said two radially-retractable optical elements when said other of said two radially-retractable optical elements was in said operating state of said retractable photographic lens as viewed from a front of said retractable photographic lens, and moved rearward in said optical axis direction to be positioned adjacent to each other in a plane orthogonal to said optical axis, without an optical element positioned between the two radially-retractable optical elements.

16. A retractable photographic lens including a photographing optical system comprising:

a plurality of optical elements including a frontmost optical element and two radially-retractable optical elements;

wherein said plurality of optical elements are aligned with an optical axis in an operating state of said retractable photographic lens, and wherein, when said retractable photographic lens moves from said operating state to a fully retracted state, said two radially-retractable optical elements of said plurality of optical elements are radially retracted to respective radially retracted positions away from said optical axis in different radial directions and moved rearward in said optical axis direction to be positioned adjacent to each other in a plane orthogonal to said optical axis, such that at least a portion of each of the radially-retractable optical elements and the frontmost optical element overlap with each other, as viewed from a front of the frontmost optical element, when the retractable photographic lens is in the fully retracted state.

* * * * *